United States Patent
Kansau et al.

(10) Patent No.: US 12,447,172 B2
(45) Date of Patent: Oct. 21, 2025

(54) **USE OF THE miR-27a-5p microRNA FOR TREATING *CLOSTRIDIUM DIFFICILE*-INDUCED BOWEL INFLAMMATION**

(71) Applicants: UNIVERSITE PARIS-SACLAY, Saint Aubin (FR); ASSISTANCE PUBLIQUE—HOPITAUX DE PARIS, Paris (FR)

(72) Inventors: Imad Kansau, Paris (FR); Hussein Kobeissy, Antony (FR); Cecile Larrazet, Montigny-le Bretonneux (FR); Jean-Christophe Marvaud, Versailles (FR)

(73) Assignees: UNIVERSITE PARIS-SACLAY, Saint Aubin (FR); Assistance Publique—Hôpitaux de Paris, Paris (FR)

( * ) Notice: Subject to any disclaimer, the term of this patent is extended or adjusted under 35 U.S.C. 154(b) by 1042 days.

(21) Appl. No.: 17/292,097

(22) PCT Filed: Nov. 8, 2019

(86) PCT No.: PCT/EP2019/080748
§ 371 (c)(1),
(2) Date: May 7, 2021

(87) PCT Pub. No.: WO2020/094865
PCT Pub. Date: May 14, 2020

(65) Prior Publication Data
US 2022/0143065 A1    May 12, 2022

(30) Foreign Application Priority Data

Nov. 9, 2018 (FR) ...................... 1860380

(51) Int. Cl.
*A61K 31/713* (2006.01)
*A61P 1/04* (2006.01)
*A61P 1/12* (2006.01)

(52) U.S. Cl.
CPC .............. *A61K 31/713* (2013.01); *A61P 1/04* (2018.01); *A61P 1/12* (2018.01)

(58) Field of Classification Search
CPC ............. A61K 31/713; A61P 1/04; A61P 1/12
See application file for complete search history.

(56) References Cited

U.S. PATENT DOCUMENTS 11,293,064 B2 * 4/2022 Rigoutsos ............ C12Q 1/6886

FOREIGN PATENT DOCUMENTS

| EP | 2 021 499 A2 | 2/2009 |
| KR | 10-2015 0043789 A | 4/2015 |
| WO | 2007/078599 A2 | 7/2007 |
| WO | 2007/078599 A3 | 7/2007 |

OTHER PUBLICATIONS

Kong, Lei et al. "Effect of microRNA-27a-5p on apoptosis and inflammatory response of pancreatic acinar cells in acute pancreatitis by targeting PTEN." Journal of cellular biochemistry vol. 120,9 (2019): 15844-15850. doi: 10.1002/jcb.28855 (Year: 2019).*
Martinez, F. J., Leffler, D. A., & Kelly, C. P. (2012). Clostridium difficile outbreaks: prevention and treatment strategies. Risk Management and Healthcare Policy, 5, 55-64. https://doi.org/10.2147/RMHP.S13053 (Year: 2012).*
Dinleyici, M., Vandenplas, Y. (2019). Clostridium difficile Colitis Prevention and Treatment. In: Guandalini, S., Indrio, F. (eds) Probiotics and Child Gastrointestinal Health. Advances in Experimental Medicine and Biology( ), vol. 1125. Springer, Cham. https://doi.org/10.1007/5584_2018_322 (Year: 2019).*
Ng, J., Hirota, S. A., Gross, O., Li, Y., Ulke-Lemee, A., Potentier, M. S., . . . & Beck, P. L. (2010). Clostridium difficile toxin-induced inflammation and intestinal injury are mediated by the inflammasome. Gastroenterology, 139(2), 542-552. (Year: 2010).*
Wang, Z., Ruan, Z., Mao, Y., Dong, W., Zhang, Y., Yin, N., & Jiang, L. (2014). miR-27a is up regulated and promotes inflammatory response in sepsis. Cellular immunology, 290(2), 190-195. (Year: 2014).*
Cloud, J. and C.P. Kelly, "Update on *Clostridium difficile* associated disease", Curr Opin Gastroenterol, 2007, vol. 23, No. 1, pp. 4-9 (6 pages).
Heinlen, L. and J.D. Ballard, "*Clostridium difficile* infection", Am J Med Sci., Sep. 2010, vol. 340, No. 3, pp. 247-252 (11 pages total).
Dubberke, E.R. and M.A. Olsen, "Burden of *Clostridium difficile* on the healthcare system", Clinical Infectious Diseases, 2012, vol. 55, Suppl 2, pp. S88-S92 (5 pages total).
Miller, M.A., et al., "Morbidity, mortality, and healthcare burden of nosocomial *Clostridium difficile*—associated diarrhea in Canadian hospitals", Infect Control Hosp Epidemiol, 2002, No. 23, No. 3, pp. 137-140 (5 pages total).
Carrico, R.M., "Silent menace. *C. difficile* and its threat to health care facilities", Health Facil Manage, 2011, vol. 24, No. 6, pp. 43-45 (4 pages total).
Dubberke, E.R. and A.I. Wertheimer, "Review of current literature on the economic burden of *Clostridium difficile* infection", Infect Control Hosp Epidemiol, 2009, vol. 30, No. 1, pp. 57-66 (11 pages total).

(Continued)

*Primary Examiner* — Jennifer Dunston
*Assistant Examiner* — Christina Tran
(74) *Attorney, Agent, or Firm* — Sughrue Mion, PLLC

(57) ABSTRACT

The present inventors have identified an miRNA capable of greatly modulating the inflammatory response induced by *Clostridium difficile*. They thus propose incorporating this miRNA into a pharmaceutical composition for preventing or reducing the harmful effects of this infection on the bowels of infected patients. This microRNA is miR-27a-5p. Advantageously, this miRNA can be linked to a matrix, incorporated into particles, or conveyed by a vector. It can be administered to infected subjects for therapeutic purposes.

8 Claims, 10 Drawing Sheets

Figure 1:
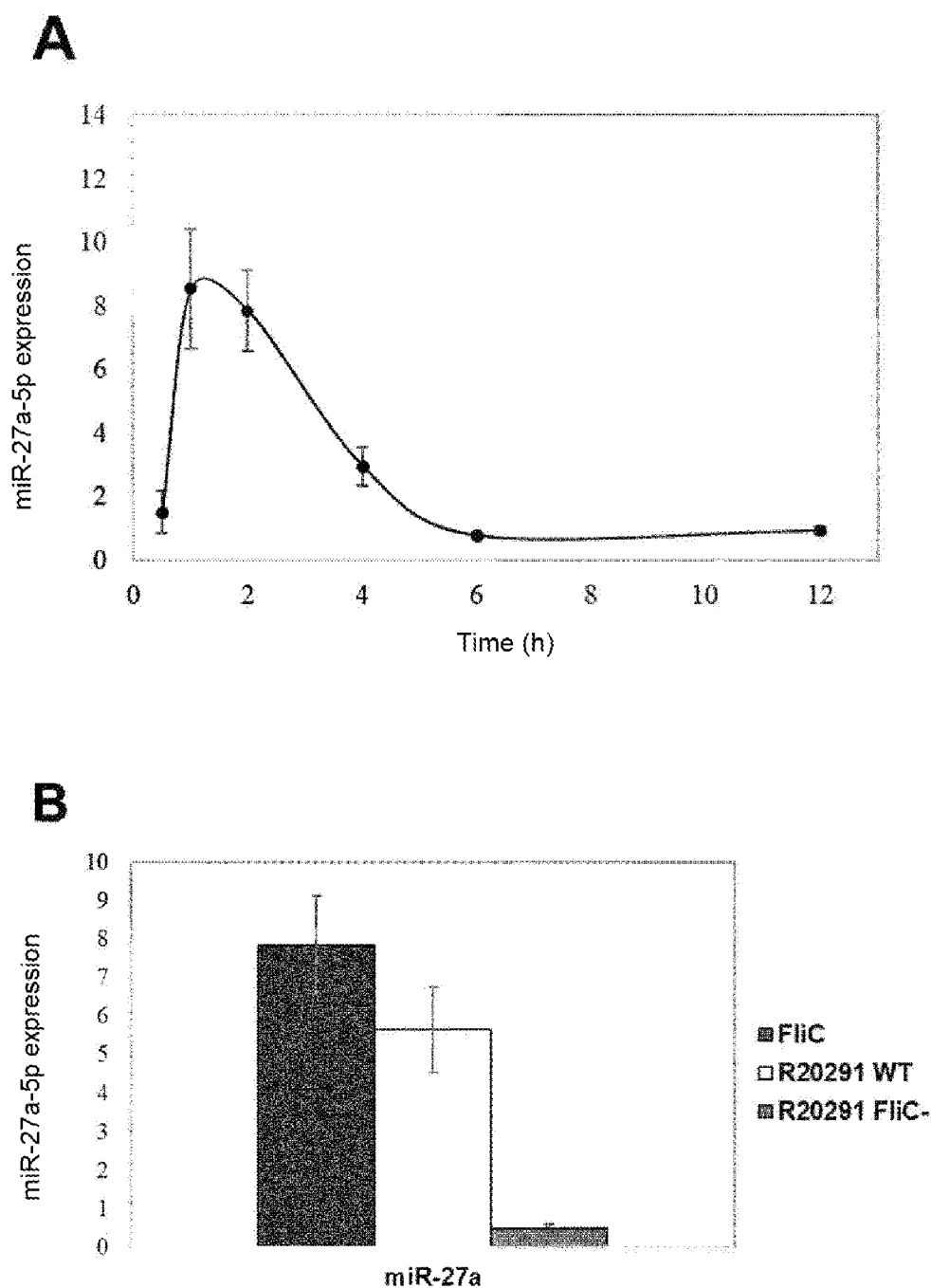

Specification includes a Sequence Listing.

(56) References Cited

OTHER PUBLICATIONS

O'Brien, J.A., et al., "The emerging infectious challenge of *Clostridium difficile*—associated disease in Massachusetts hospitals: clinical and economic consequences", Infect Control Hosp Epidemiol, 2007, vol. 28, No. 11, pp. 1219-1227 (10 pages total).
Rebmann, T. and R.M. Carrico, "Preventing *Clostridium difficile* infections: an executive summary of the Association for Professionals in Infection Control and Epidemiology's elimination guide", Am J Infect Control, 2011, vol. 39, No. 3, pp. 239-242(4 pages total).
McGlone, S.M., et al., "The economic burden of *Clostridium difficile*", Microbiol Infect, 2012, vol. 18, No. 3, pp. 282-289 (13 pages total).
Kuijper, E.J., B. Coignard, and P. Tull, "Emergence of *Clostridium difficile*—associated disease in North America and Europe", Clinical Microbiology and Infection, 2006, vol. 12, Suppl 6, pp. 2-18 (17 pages total).
Wiegand, P.N., et al., "Clinical and economic burden of *Clostridium difficile* infection in Europe: a systematic review of healthcare-facility-acquired infection", Journal of Hospital Infection, 2012, vol. 81, No. 1, pp. 1-14 (14 pages total).
Eckert, C. and F. Barbut, "*Clostridium-difficile*—associated infections", Med Sci (Paris), Feb. 2010, vol. 26, No. 2, pp. 153-158 (6 pages total), "summary" only.
Kuehne, S.A., et al.,"The role of toxin A and toxin B in *Clostridium difficile* infection", Nature, Oct. 2010, vol. 467, No. 7316, pp. 711-713 (4 pages total).
Lyras, D., et al., "Toxin B is essential for virulence of *Clostridium difficile*", Nature, 2009, vol. 458, No. 7242 (11 pages total).
Tasteyre, A., et al., "Role of FliC and FliD flagellar proteins of *Clostridium difficile* in adherence and gut colonization", Infection and Immunity, Dec. 2001, vol. 69, No. 12, pp. 7937-7940 (4 pages total).
Batah, J., et al., "*Clostridium difficile* flagella predominantly activate TLR5—linked NF-κB pathway in epithelial cells", Anaerobe, 2016, vol. 38, pp. 116-124 (9 pages total).
Batah, J., et al. ,"*Clostridium difficile* flagella induce a pro-inflammatory response in intestinal epithelium of mice in cooperation with toxins", Sci Rep, 2017, vol. 7, No. 3256 (10 pages total).
Bentwich, I., et al., "Identification of hundreds of conserved and nonconserved human microRNAs", Nature Genetics, Jul. 2005, vol. 37, No. 7, pp. 766-770 (5 pages total).
He, X., Z. Jing, and G. Cheng, "MicroRNAs: new regulators of Toll-like receptor signalling pathways", Biomed Res Int, vol. 2014, 2014, ID 945169 (14 pages total).
Taganov, K.D., et al., "NF-κB—dependent induction of microRNA miR-146, an inhibitor targeted to signaling proteins of innate immune responses", Proc Natl Acad Sci USA, Aug. 15, 2006, vol. 103, No. 33, pp. 12481-12486 (6 pages total).
Bader, A.G., et al., "Developing therapeutic microRNAs for cancer", Gene Ther, Dec. 2011, vol. 18, No. 12 (12 pages total).
Minton, N., et al., "The development of *Clostridium difficile* genetic systems", Anaerobe, 2004, vol. 10, No. 2, pp. 75-84 (10 pages total).
Häsler R, et al., "Microbial pattern recognition causes distinct functional micro-RNA signatures in primary human monocytes", 2012, PloS One, vol. 7, No. 2, e31151(9 pages total).
Norman E Buroker et al., "Circulating miRNAs from Dried Blood Spots are Associated with High Altitude Sickness", J Med Diagn Meth, 2013, vol. 2, Issue 3 (7 pages total).
Romay MC, et al., "Regulation of NF-κB signaling by oxidized glycerophospholipid and IL-1β induced miRs-21-3p and -27a-5p in human aortic endothelial cells", Journal of Lipid Research, vol. 56, pp. 38-50, 2015 (13 pages total).
Nahid MA, et al., "Regulation of TLR2-mediated tolerance and cross-tolerance through IRAK4 modulation by miR-132 and miR-212", J Immunol Baltim Md., vol. 190, pp. 1250-1263, Feb. 1, 2013 (30 pages total).
Liu G, et al., "miR-147, a microRNA that is induced upon Toll-like receptor stimulation, regulates murine macrophage inflammatory responses", PNAS, Sep. 15, 2009, vol. 106, No. 37, pp. 15819-15824 (6 pages total).
Ceppi M, et al., "MicroRNA-155 modulates the interleukin-1 signaling pathway in activated human monocyte-derived dendritic cells", Proc Natl Acad Sci, USA, vol. 106, No. 8, pp. 2735-2740, 2009 (6 pages total).
Lu Z, et al., "miR-301a as an NF-κB activator in pancreatic cancer cells", EMBO Journal, vol. 30, pp. 57-67, 2011 (11 pages total).
Wang B, et al., "Systematic Evaluation of Three microRNA Profiling Platforms: Microarray, Beads Array, and Quantitative Real-Time PCR Array", PLoS One, vol. 6, Issue 2, e17167, Feb. 2011(12 pages total).
Martimprey H et al., "New Core—Shell nanoparticles for the intravenous delivery of siRNA to experimental thyroid papillary carcinoma", Pharmaceutical Research, vol. 27, No. 3, Mar. 2010 (12 pages total).
Elena Reigadas Ramírez and Emilio Santiago Bouza, "Economic Burden of Clostridium difficile Infection in European Countries", Adv Exp Med Biol., 2018, vol. 1050, pp. 1-12 (12pages total).
Rupaimoole R. & Slack F.J., "MicroRNA therapeutics: towards a new era for the management of cancer and other diseases", Nat Rev Drug Discov., Mar. 2017, vol. 16, No. 3, pp. 203-222 (19 pages total).
Lagos-Quintana M, Rauhut R, Lendeckel W, Tuschl T., "Identification of novel genes coding for small expressed RNAs", Science., Oct. 26, 2001, vol. 294, No. 5543, pp. 853-858 (7 pages total).
Wu et al., "Coordinated Targeting of the EGFR Signaling Axis by MicroRNA-27a", Oncotarget, vol. 4, No. 9, 1388-98, Sep. 2013 (11 pages total).
Geary RS, "Pharmacokinetic properties of 2'-O-(2-methoxyethyl)—modified oligonucleotide analogs in rats", J Pharmacol Exp Ther., Mar. 2001, vol. 296, No. 3, pp. 890-897 (8 pages total).
Baumann V. and Winckler J., "miRNA-based therapies: Strategies and delivery platforms for oligonucleotide and non-oligonucleotide agents", Future Med Chem., 2014, vol. 6, No. 17, pp. 1967-1984 (31 pages total).
Chen H., "miR-27a protects human mitral valve interstitial cell from TNF-α—induced inflammatory injury via up-regulation of NELL-1", Brazilian Journal of Medical and Biological Research, 2018, vol. 51, No. 6, e6997 (10 pages total).
Barros-Silva D, Costa-Pinheiro P, Duarte H, Sousa EJ, Evangelista AF, Graça I, et al., "MicroRNA-27a-5p regulation by promoter methylation and MYC signaling in prostate carcinogenesis", Cell Death and Disease, Feb. 7, 2018, vol. 9, No. 2, vol. 167 (15 pages total).
Mertens-Talcott SU, Chintharlapalli S, Li X, Safe S., "The oncogenic microRNA-27a targets genes that regulate specificity protein transcription factors and the $G_2$-M checkpoint in MDA-MB-231 breast cancer cells", Cancer Res., Nov. 15, 2007, vol. 67, No. 22, pp. 11001-11011 (12 pages total).
Xie N. et al., "miR-27a regulates inflammatory response of macrophages by targeting IL-10", J Immunol., Jul. 1, 2014, vol. 193, No. 1, pp. 327-334 (19 pages total).
Pfeiffer D. et al., "miR-146a, miR-146b, and miR-155 increase expression of IL-6 and IL-8 and support HSP 10 in an In vitro sepsis model", PLOS One, vol. 12, No. 6, e0179850, Jun. 29, 2017 (14 pages total).
Gao et al., "MicroRNA-146 regulates the inflammatory cytokines expression in vascular endothelial cells during sepsis", Die Pharmazie—An International Journal of Pharmaceutical Sciences, vol. 72, No. 11, Nov. 2017, pp. 700-704 (5 pages total).
Viladomiu Pujol M. et al., "Immunoregulatory mechanisms of microRNAs during Clostridium Difficile infection", Nutritional Immunology and Molecular Medicine Laboratory, Jan. 1, 2014, XP055589249, URL:https://www.nimml.org/publications/poster/immunoregulatory-mechanisms-of-micrornas-during-clostridium-difficile-infec (3 pages total).
"History of Changes for Study: NCT01930032 Pathogenic Mechanisms in C Diff Infection and Colitis", Archive History for

(56) References Cited

OTHER PUBLICATIONS

NCT01930032, XP055589255, URL:https://clinicaltrials.gov/ct2/history/NCT01930032?V_6=View#StudyPageTop (8 pages total), (2017).

Kurt Fisher et al., "MicroRNA in inflammatory bowel disease: Translational research and clinical implication", World Gastroenterol, Nov. 21, 2015, vol. 21, No. 43, pp. 12274-12282, XP055589256 (10 pages total).

Ying Cheng et al., "Mmu-miR-27a-5p-Dependent Upregulation of MCPIP1 Inhibits the Inflammatory Response in LPS-Induced RAW264.7 Macrophage Cells", Biomed Research International, vol. 2015, Article ID 607692, (Jan. 1, 2015), pp. 1-10, XP055589271 (11 pages total).

International Search Report and Written Opinion dated Apr. 14, 2020 from the International Searching Authority in International Application No. PCT/EP2019/080748.

\* cited by examiner

USE OF THE miR-27a-5p microRNA FOR TREATING *CLOSTRIDIUM DIFFICILE*-INDUCED BOWEL INFLAMMATION

CROSS-REFERENCE TO RELATED APPLICATIONS

This application is a National Stage of International Application No. PCT/EP2019/080748 filed Nov. 8, 2019, which claims priority under U.S.C. § 119(a) to French Patent Application No. 1860380 filed on Nov. 9, 2018.

INCORPORATION BY REFERENCE OF SEQUENCE LISTING

The content of the electronically submitted sequence listing, file name: Q263930SEQLISTINGREVTXT.txt; size: 8248 Bytes; and date of creation: May 7, 2021, filed herewith, is incorporated herein by reference in its entirety.

SUMMARY OF THE INVENTION

The present inventors have identified a miRNA capable of strongly modulating the inflammatory response induced by *Clostridium difficile*. They therefore propose to incorporate this miRNA in a pharmaceutical composition to prevent or reduce the deleterious effects of this infection on the intestines of infected patients. This microRNA is miR-27a-5p. Advantageously, this miRNA can be associated with a matrix, incorporated into particles, or carried by a vector. It can be administered to infected subjects for therapeutic purposes.

DESCRIPTION OF THE PRIOR ART

*Clostridium difficile* is the principal enteropathogenic bacterium responsible for post-antibiotic infections in industrialized countries [1, 2]. Antibiotic exposure, hospitalization and advanced age are the main risk factors associated with *C. difficile* infection (CDI) [1]. CDI can range from mild diarrhea to severe life-threatening pseudomembranous colitis.

The increase in the incidence and severity of CDI in recent years coincides with the emergence of epidemic clones, in particular ribotype 027 strains. This increase has been accompanied by an increase in the cost of care [3, 4]. According to estimates, the cost of treatment associated with CDIs in the United States is $3 billion per year with similar projections for Canada [5-8]. In the United States, the annual economic burden of CDI on the healthcare system is estimated to be nearly $4.8 billion per year in excess costs in acute care facilities [3]. Most of these costs have been attributed to primary episodes of CDI, with a cost of $12,607 per case [9]. In Europe, the costs of managing DCI estimated by the European Centre for Disease Prevention and Control (ECDC) are nearly $4.4 billion per year [10]. In twelve years, the excess costs of CDI may have increased by 27 to 93% depending on the country [11; 39]. In France, estimates of excess costs can vary from €1,666 to €5,867 per case of CDI [12].

These high costs are largely related to the need for patient isolation and longer hospital stays. However, the total burden of CDI is likely to be greatly underestimated, since the costs of recurrences, CDI-induced adverse events (complications), the cost of care in long-term care facilities and the social costs have yet to be defined. This is also the case for community (out-of-hospital) CDI.

Cytolytic toxins of *C. difficile* A and B (known as TcdA and TcdB, respectively) contribute directly to the pathology associated with CDI [13, 14], but other factors play a role in the colonization and pathogenicity of the bacteria. Among these factors, the flagella conferring motility and chemotaxis to the bacteria [15] are believed to play a role in the intestinal inflammatory response through the activation of the mitogen-activated protein kinase (MAPK) and NF-κB signaling pathways, via interaction with the cell receptor of the innate immune response Toll-like receptor 5 (TLR5) [16]. In this pro-inflammatory response, the NF-κB pathway seems to be the predominant pathway. Furthermore, in vivo in a mouse model of CDI, toxins acted in cooperation with *C. difficile* flagella to induce an inflammatory response, suggesting a synergistic role of toxins and flagella in the intestinal inflammatory response [17]. The severity of intestinal inflammation correlates with the severity of clinical presentations of CDI.

Different mechanisms of regulation of the cell receptor signaling pathways of the innate immune response, the Toll-like receptors (TLRs), have been described. Among these mechanisms, microRNAs (miRNAs), non-coding RNA sequences of 21 to 24 nucleotides, responsible for the post-transcriptional regulation of genes by their specific action on m RNAs [18], play a role as immunomodulators of the innate response by regulating TLR-dependent pathways. The miRNAs, whose expression is induced by the activation of TLRs, modulate the inflammatory response by inhibiting effectors of the signaling cascades. They act on the expression of effector targets, transcription factors of inflammation pathways and TLR themselves [19, 20].

To date, it has never been demonstrated or suggested that it was possible to effectively reduce the *Clostridium difficile*-induced intestinal inflammatory response using a miRNA modulating the TLR signaling pathway, for example the NF-κB pathway.

However, miRNAs are molecules known for their lack of deleterious effects on normal tissues. They are now considered to be effective next-generation drug candidates, particularly for the treatment of cancers ([40]).

In this context, it would be very advantageous to identify a miRNA capable of strongly modulating the *Clostridium difficile*-induced inflammatory response, for example by sufficiently inhibiting the NF-κB pathway overactivated during this infection. The incorporation of such a miRNA in a pharmaceutical composition would make it possible to obtain a drug capable of preventing or reducing the deleterious effects of this bacterium on the intestines of infected patients.

DETAILED DESCRIPTION OF THE INVENTION

Based on this reasoning, the present inventors studied the expression of a panel of miRNAs potentially involved in the TLR5-NF-κB signaling pathway in vitro and in vivo, in the Caco-2 human intestinal epithelial cell model and in a mouse model of CDI.

Figure 4:
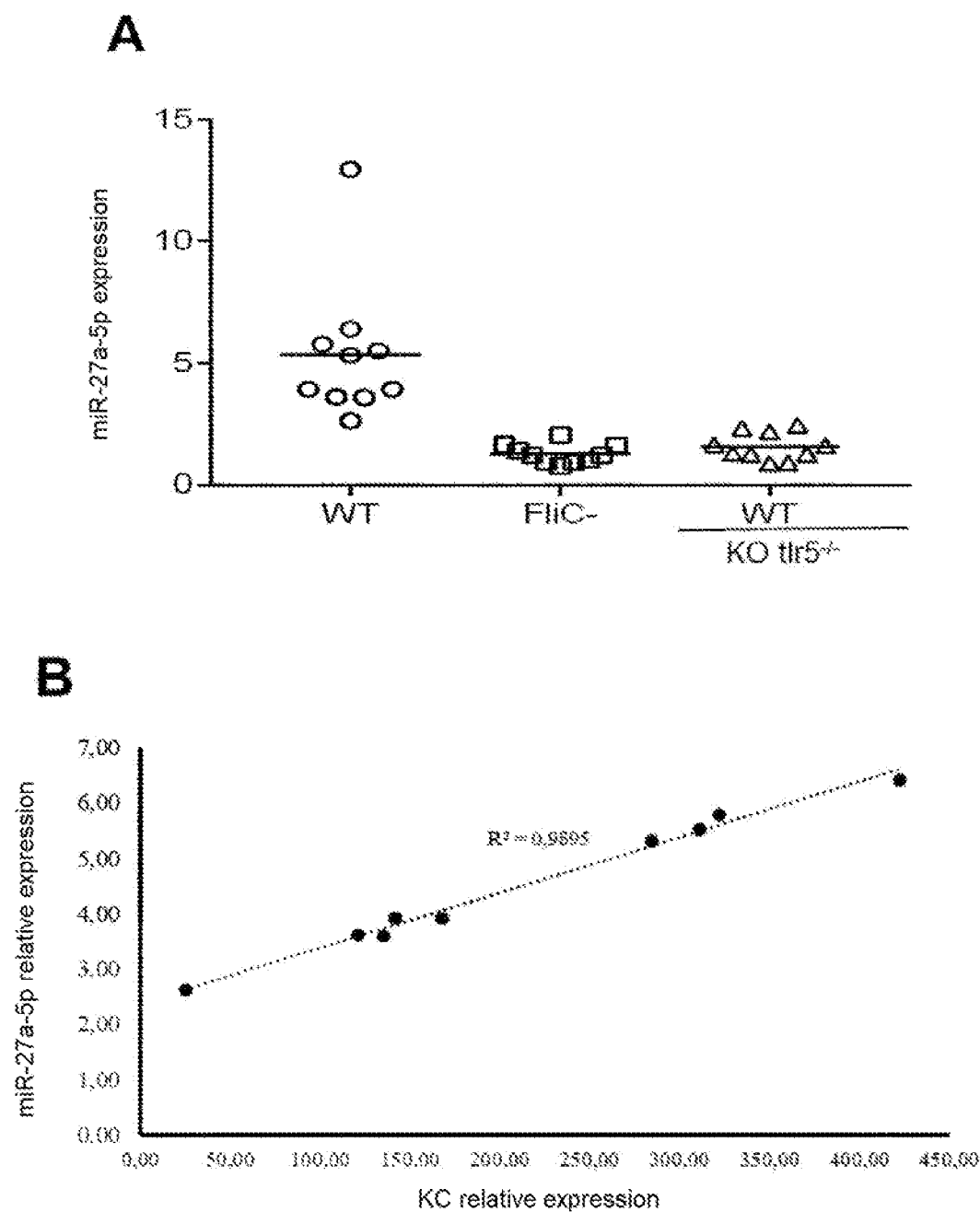
Figure 5:
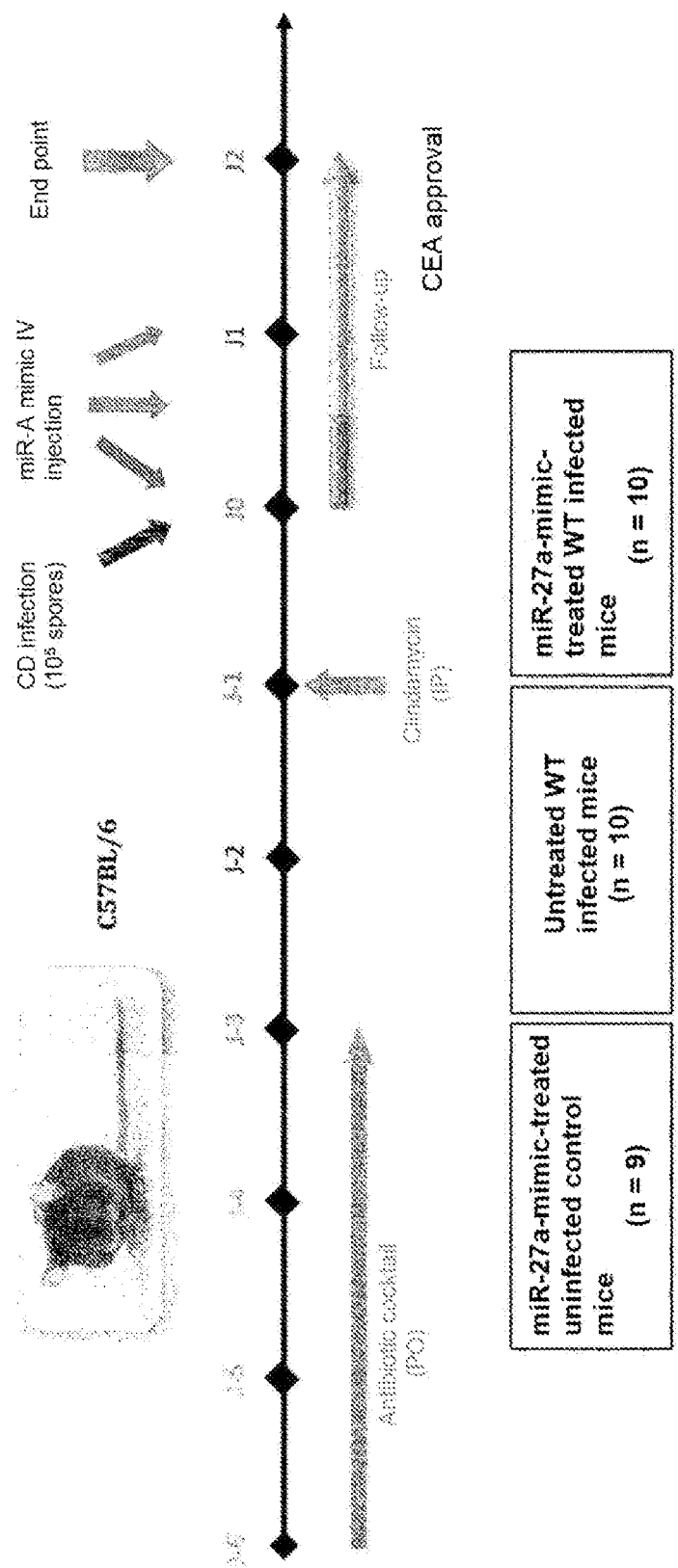
Figure 6:
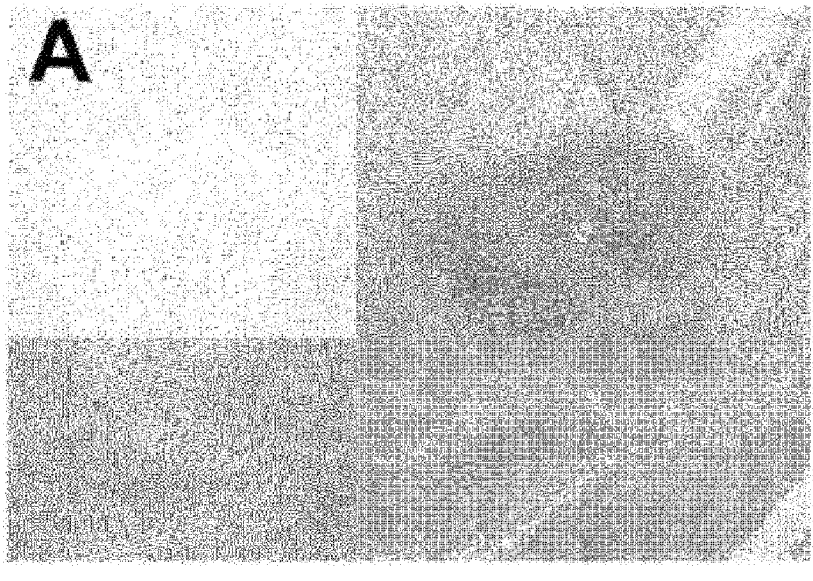
Figure 6:
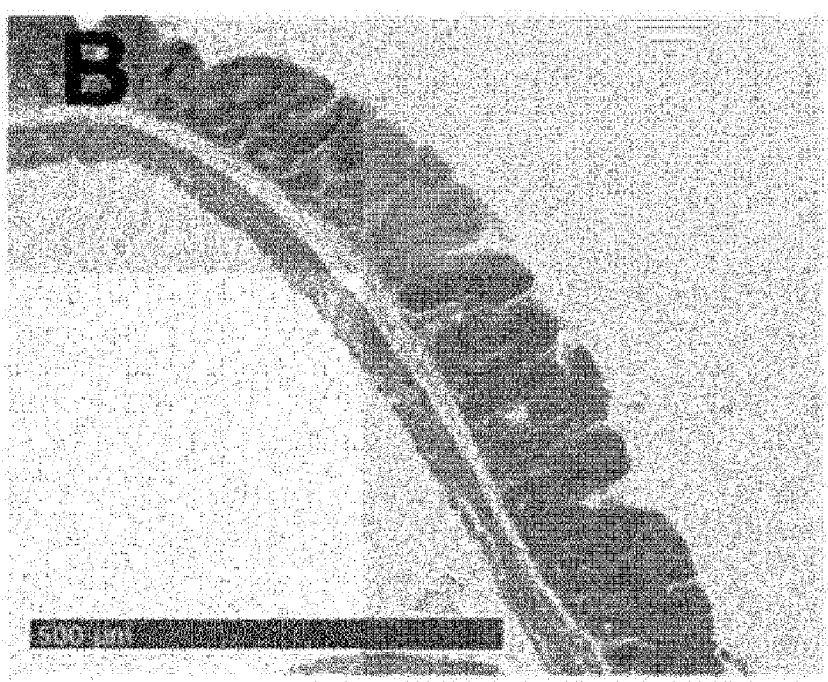
Figure 6:
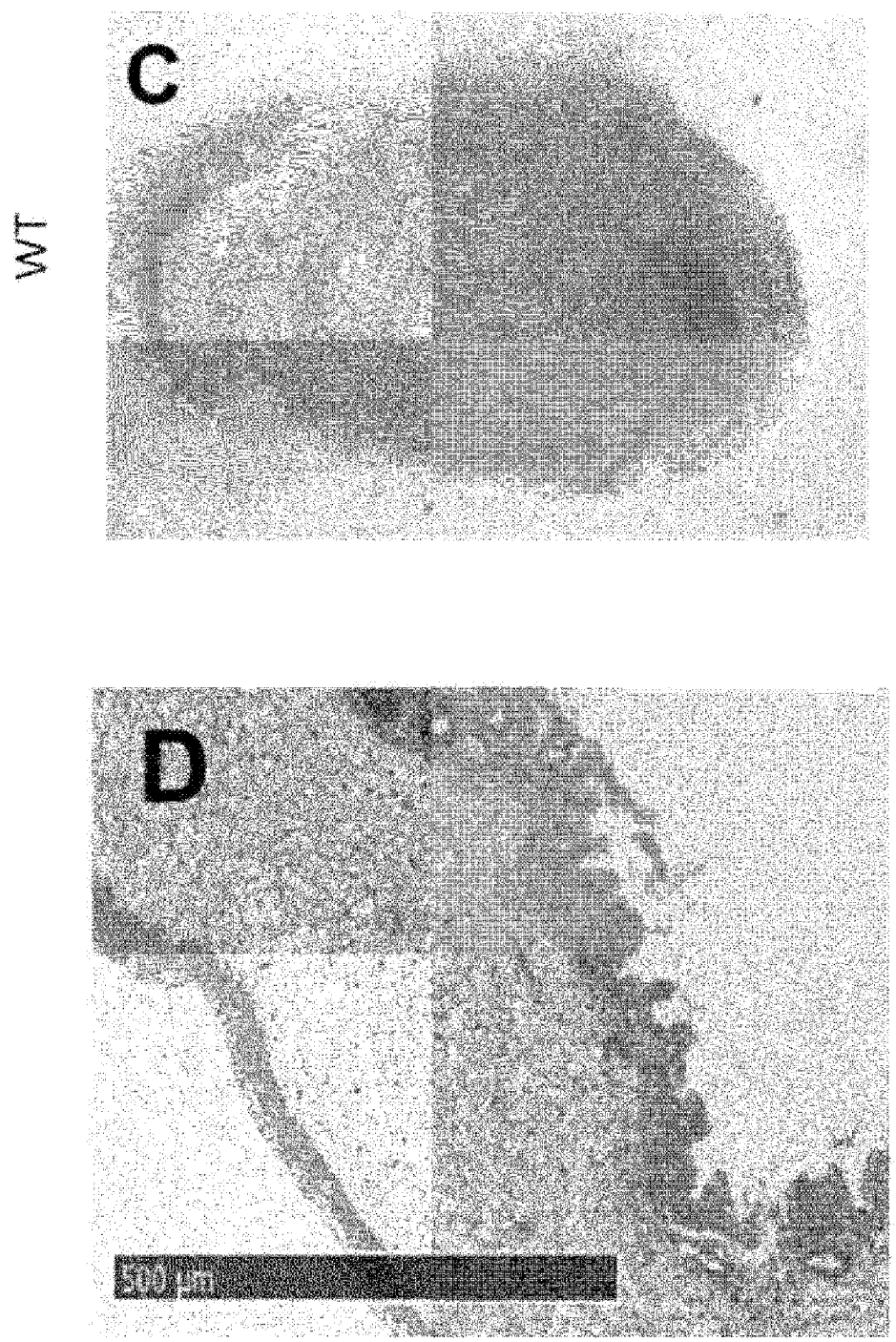
Figure 6:
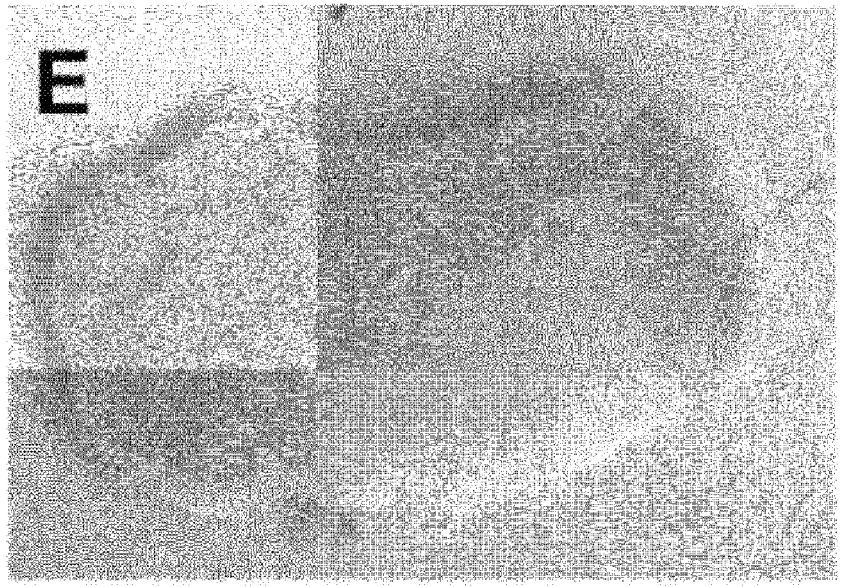
Figure 6:
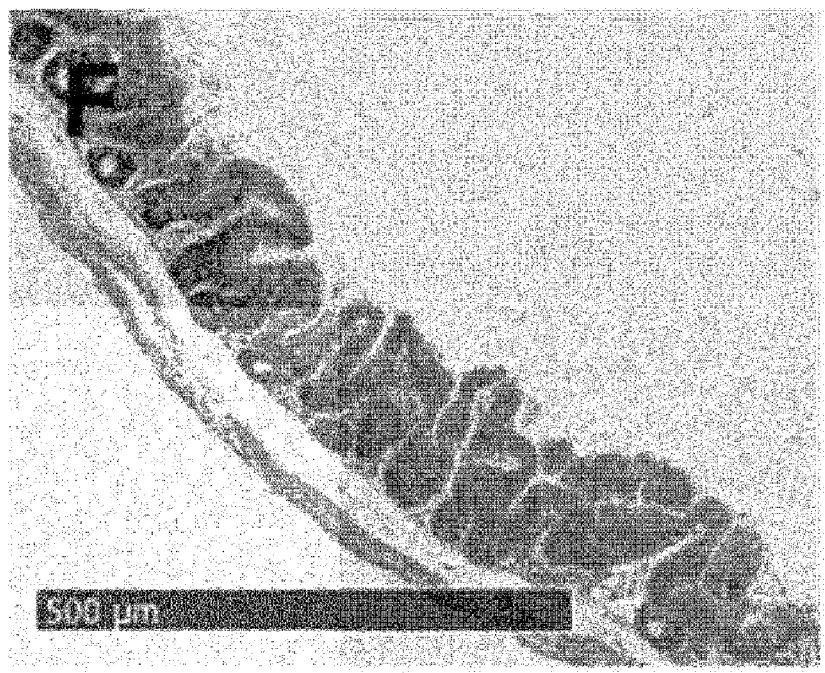
Figure 6:
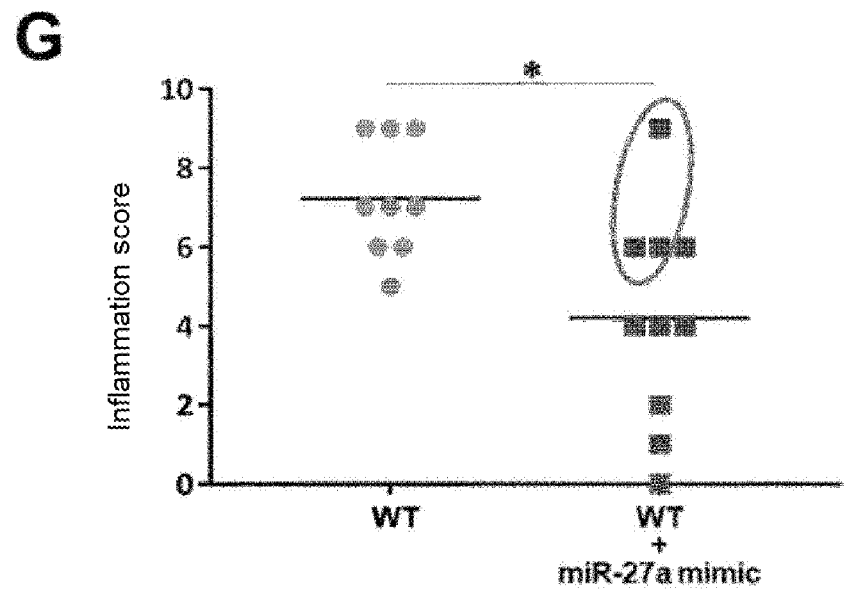
Figure 6:
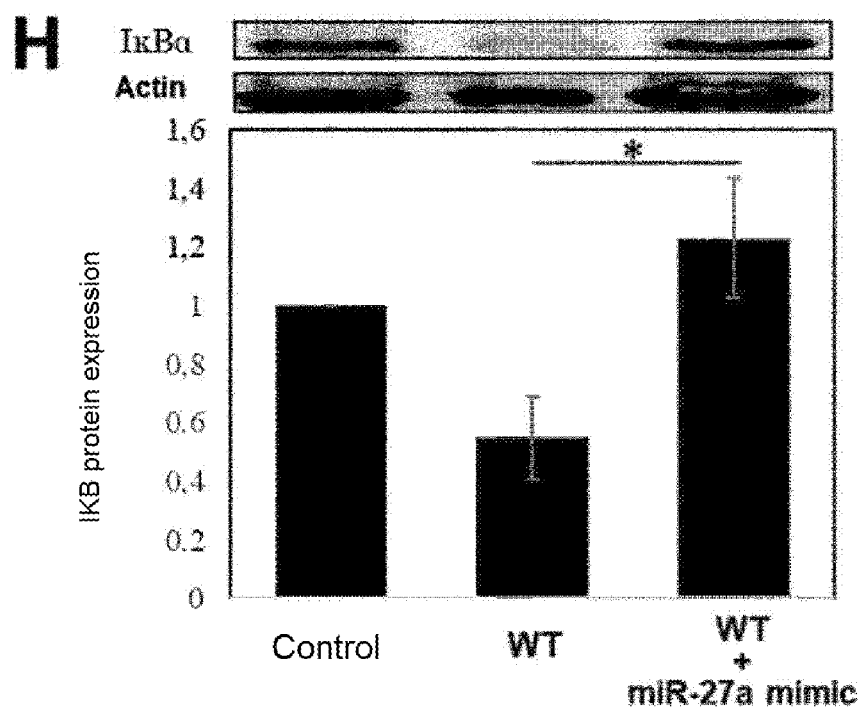

The miRNA known in the literature as "miR-27a-5p" appeared to be significantly overexpressed over time in Caco-2 cells stimulated by *C. difficile* flagella or infected with the whole bacterium (FIG. 1). These results show that this miRNA plays a role in the *C. difficile* flagellum-induced response. Furthermore, analysis of in vivo expression of miR-27a-5p in the cecum of conventional microbiota mice or TLR5 KO mice (tlr5$^{-/-}$) infected with *C. difficile* or a non-flagellate mutant, revealed that this miRNA is also overexpressed in the cecum of wild-type infected mice, whereas no variation in the expression of this miRNA was observed in the cecum of non-flagellate mutant infected mice or in the cecum of tlr5$^{-/-}$ KO mice infected with the wild-type strain (FIG. 4). Finally, a mimic of this miRNA ("miR-27a-5p-mimic") was administered intravenously in a mouse model of CDI to study the host response responsible for the tissue damage and severe clinical manifestations. The results of this experiment show that miR-27a-5p mimic significantly reduces the clinical and pathological manifestations caused by the bacteria during infection in this mouse model (FIGS. 5 and 6).

This result provides proof of concept for an important role of this miR-27a-5p in modulating the inflammatory response during CDI.

More precisely, the whole of the results presented below demonstrate that *C. difficile* flagella induce an overexpression of miR-27a-5p that decreases the degree of inflammatory response and consequently reduces the clinical manifestations observed during intestinal infection with *C. difficile*.

This work highlights the major role of miR-27a-5p in decreasing the inflammatory response induced by *C. difficile* toxins and flagella and in preventing (or decreasing) the mucosal damage caused by this inflammation. This miRNA therefore impacts the clinical presentation and prognosis of CDI.

To reduce the severe deleterious effects of infection with this bacterium, the present inventors propose to use this miRNA as an active principle in a therapeutic composition.

In a first aspect, the present invention is directed to a pharmaceutical composition containing a miR-27a-5p mimic, for use in preventing or decreasing intestinal lesions in a subject suffering from *Clostridium difficile* infection.

In the context of the present application, the term "miRNA" is used to designate a micro-RNA. These are short non-coding RNAs having between 20 and 25 nucleotides, binding to target mRNAs and thus inhibiting their translation. These miRNAs can be in double-stranded form (precursor or duplex) or single-stranded form (mature form, ready to bind to the target mRNA).

The miRNA known as "miR-27a-5p" is a double-stranded RNA having in mouse and human the same sequence SEQ ID NO: 1 (AGGGCUUAGCUGCUUGUGAGCA). It was identified in 2001 ([41]) and has been implicated in the NF-κB pathway in aortic cells ([42]), and in cancer ([43]). It has also been identified in mitral valve interstitial cells ([46]).

The cellular mechanisms involved in these different studies are totally unrelated to the results observed by the present inventors: in the two papers [42] and [46], TLRs are not involved. In the paper [46], the NF-κb pathway is not activated, it is the JNK and Wnt/B-catenin pathway that is involved.

Moreover, it is well known in the art that the same miRNA can have a given role under given conditions and in a given cell type and a completely opposite role in another cell type. For example, miR-27a itself may have an oncogenic role in breast cancer, but a tumor suppressor role in prostate cancers ([47]; [48]). In contrast to the present inventors, some teams have even suggested that miR-27a increases the IL-10-mediated inflammatory response in activated macrophages ([49]). It is also known that miR-146a has opposite effects depending on the cells considered (pro-inflammatory effect in endothelial cells stimulated by LPS-activated monocyte supernatants [50] or anti-inflammatory effect in LPS-stimulated vascular endothelial cells [51]).

As used herein, "miR-27a-5p mimic" means any synthetic double-stranded RNA molecule that has the same or a similar sequence to that of miR-27a-5p allowing the same genetic target to be modulated. Preferably, this synthetic molecule differs from natural miRNAs in that it has undergone chemical modifications to increase its stability against RNases and RNA-induced silencing complex (RISC) proteins.

Said chemical modifications are for example methylation, addition of phosphorothioate groups (replacement of the non-bonding oxygen of the phosphate group by a sulfur atom), addition of methyl groups (for example 2'-O-methyl or 2'-O-methoxyethyl) at different locations of the structure ([44]).

As used herein, "similar sequence" means a nucleic acid sequence having a percent identity greater than or equal to 70%, preferably greater than or equal to 80%, and even more preferably greater than or equal to 90%, with the known natural miR-27a-5p sequence (for example SEQ ID NO: 1). "Percent identity" between two nucleic acid sequences is understood to mean a percentage of identical nucleotides between the two sequences to be compared, obtained after the best alignment (optimal alignment), this percentage being purely statistical and the differences between the two sequences being randomly distributed over their entire length.

This percent identity can be calculated by any sequence analysis method well known to the person skilled in the art. The percent identity can be determined after global alignment of the sequences to be compared taken as a whole. In addition to manual determination, it can also be determined using the algorithm of Needleman and Wunsch (1970). For the nucleotide sequences, the sequence comparison can be carried out using any software well known to the skilled person, such as the Needle software. The parameters used can be the following: "Gap Open" equal to 10.0, "Gap Extend" equal to 0.5 and the EDNAFULL matrix (EMBOSS version of NCBI NUC4.4). This percentage can also be determined after local alignment of the sequences to be compared. In addition to manually, the algorithm of Smith and Waterman (1981) can be used to determine this percentage. Preferably, the percent identity defined in the context of the present invention is determined by means of a global alignment of the sequences to be compared over their entire length.

Preferably, the "miR-27a-5p mimic" is a synthetic double-stranded RNA molecule that contains at least 5 or 6 consecutive nucleotides of miR-27a-5p [the part that binds to the target mRNA]. The remainder of its oligonucleotide sequence then preferably has a percent identity with the other part of the miRNA of at least 70%.

Even more preferably, said "miR-27a-5p mimic" is the double-stranded RNA having the sequence SEQ ID NO: 2 (5'-AGGGCUUAGCUGCUUGUGACCCCC-3') and having the companion sequence SEQ ID NO: 3 (5'-GGGGGU-CACAAGCAGCUAAGCCCU-3') (or its complement), marketed by RIBOXX under number M-00303-0200 CON-miR® Mimic in vivo.

In the pharmaceutical composition of the invention, the miRNA mimic can be naked. It can also be complexed with positively-charged chemical molecules or nanoparticles (i.e., particles with a diameter of less than 1 μm), or wrapped in protective materials, for example, capsules, liposomes, etc., so as to promote its stability and transfectability (entry into the target cells).

Any stabilization means known to promote the transport and targeting of siRNAs may be used to facilitate the delivery of the mimic of the invention, as these molecules have the same structure. Such means are, for example, those described in [40] and [45].

In a preferred embodiment, said miR-27a-5p mimic is therefore associated with (or included in) a vector, matrix or particles promoting its stability and transfectability.

If it is carried by a vector, said vector is preferably a recombinant virus selected from: adenoviruses, retroviruses, lentiviruses, adeno-associated viruses (AAV), herpes viruses, cytomegaloviruses (CMV), vaccinia viruses, etc.

Advantageously, said recombinant virus is a defective virus, for example a defective AAV.

The term "defective virus" refers to a virus that is incapable of replicating in a target cell. Typically, the genome of defective viruses lacks at least one of the sequences necessary for replication of said virus in the infected cell. These regions can be either removed, rendered non-functional or substituted by other sequences and in particular by the nucleic acid that encodes the peptide of interest. Nevertheless, preferably, the defective virus still retains the sequences of its genome that are necessary for the encapsulation of the viral particles.

This vector can also be a bacteriophage, as these have already been used successfully to carry siRNAs. Bacteriophages such as MS2, Phi29, etc., can be used in the present invention.

If said miR-27a-5p mimic is associated with particles, the latter can be those already proposed for siRNAs transport. They can be, for example, liposomes (DOPC), lipid nanoparticles, nanocells (EnGeneIC EDV type), silica nanoparticles, exosomes, etc.

More precisely, these particles can be poly(alkylcyanoacrylate) nanoparticles, preferably coated with chitosan. The miRNA mimic of the invention can be easily adsorbed therein by ion pair formation, as previously demonstrated for siRNAs [38].

If said miR-27a-5p mimic is embedded in a matrix, said matrix may be neutral lipid emulsion (NLE), polyethylenimine (PEI), poly(lactide-co-glycolide) (PLGA), etc.

More precisely, said miR-27a-5p mimic can be complexed in a cationic polymer such as "in vivo-jetPEI®", which is well known to efficiently transport any type of nucleic acids in vivo in different organs, without eliciting an inflammatory response.

It is also possible to administer the mimic of the invention conjugated with a protein or a chemical molecule of interest, for example selected from: lipids, cholesterol, PEG, cyclodextrin, chitosan, dendrimers (of poly(amidoamine) or poly(propylenimine), N-acetyl-D-galactosamine (GalNAc), etc.

The present invention is also directed to methods for treating subjects suffering from *Clostridium difficile* infection. These methods contain a step of administering the pharmaceutical composition of the invention to patients who have been infected with *Clostridium difficile*.

Finally, the present invention relates to the use of the mimic of the invention, as defined above, to manufacture a drug intended to treat patients who have been infected with *Clostridium difficile*.

The diagnosis of CDI is classically made by i) the suspicion of a clinical picture of diarrhea, colitis with the presence of mucus and blood in the stools, the development of complications such as megacolon, pseudomembranous colitis, intestinal perforation, or ii) the detection of toxins or the bacteria itself in the stools (microbiological culture, PCR, GDH test).

A cytotoxicity test is used to detect the presence of free toxins, while a toxigenic culture reveals the presence of bacteria. Standardized methods (enzyme-linked immunosorbent assays, PCR, isothermal amplifications) are now available to detect this infection rapidly in case of symptoms (diarrhea).

In a particular embodiment, the subjects benefiting from the treatment of the invention are subjects with one of the moderate to severe forms of CDI. For example, these are subjects with significant and persistent diarrhea (more than 3 days) with dehydration, dysentery-like forms (with abdominal pain and the presence of blood and mucus in the stool), forms complicated by colonic dilatations (megacolon) and pseudomembranous colitis (often detected by endoscopy). It can also occur in patients with comorbidities (heart disease, diabetes, hepato-digestive pathologies, surgical pathologies, etc.) where CDI often manifests itself in severe forms.

These subjects can be animals (domestic or not, for example cats, dogs, horses) or human beings. Preferably, these subjects are not infants.

As used herein, "treatment" means either curative (aiming to at least relieve or stop the development of bacterial-induced intestinal lesions) or prophylactic (to reduce the risk of developing such lesions).

The pharmaceutical composition used in the invention contains, as active principle, the nucleic acid described above (optionally associated or protected by particles, vectors, lipids, etc.). It also preferably contains a pharmaceutically acceptable excipient.

In the present description, "pharmaceutically acceptable excipient" is understood to mean a compound (or a combination of compounds) which is included in a pharmaceutical composition, but which does not cause secondary reactions and which for example facilitates the administration of the active compound(s), increases its life span and/or its efficacy in the body, increases its solubility in solution or improves its preservation. These pharmaceutically acceptable excipients are well known and will be adapted by the person skilled in the art according to the nature and the mode of administration of the active compound(s) selected.

Preferably, the mimics of the invention will be administered systemically, in particular intravenously, intramuscularly, intradermally, intraperitoneally or subcutaneously, or orally. More preferably, they will be administered several times, spread out over time.

Their optimal modes of administration, dosages and dosage forms can be determined according to the criteria generally taken into account in the establishment of a treatment adapted to a patient, such as the patient's age or body weight, the severity of the patient's general condition, the tolerance of the treatment and the side effects observed.

The active principles can also be formulated as microcapsules, optionally with one or more additive carriers. For the preparation of these microcapsules, the active principles are generally combined with suitable diluents, suitable stabilizers, agents promoting the sustained release of the active principles or any other type of additive to form a central core which is then coated with a suitable polymer (for example a water-soluble resin or a water-insoluble resin). Techniques known to the skilled person will be used for this purpose. The resulting microcapsules are then optionally formulated in suitable dosage units.

The mimics of the invention can also be formulated in liposomes. Liposomes are formed from phospholipids that are dispersed in an aqueous medium and spontaneously form concentric multilamellar bilayer vesicles. These vesicles are typically 25 nm to 4 µm in diameter and can be sonicated, leading to the formation of smaller unilamellar vesicles, 200 to 500 Å in diameter, containing an aqueous solution at their core. Liposomes will be particularly advantageous for drug delivery to a specific cellular or tissue target. To this end, the lipids can be chemically coupled to targeting molecules, such as targeting peptides (for example hormones), or antibodies.

The dosage naturally depends on the vector/complex considered, the mode of administration, the stage of infection, and the patient's age and condition. Some authors have used intravenous doses of miRNAs of 10 mg/kg. Smaller doses can also be used (for example, between 3 and 5 mg/kg per day).

When the mimic of the invention is associated with a cationic polymer or with another carrier, it is possible to use higher doses (25 mg/kg), in a single dose, or in multiple doses, with repeated injections.

FIGURE LEGENDS

FIG. 1. Kinetics of miR-27a-5p expression by Caco-2 cells incubated with the flagellin FliC or *C. difficile*. (A) Kinetics of miR-27a-5p expression by Caco-2 cells incubated with FliC for 12 h. (B) Cells were incubated with FliC or infected with wild-type strain R20291 (WT) or its non-flagellate mutant (FliC-) for 1 h. miR-27a-5p expression was measured by qRT-PCR with the oligonucleotide of Table 1. Bars on each point correspond to standard deviations of means of at least 3 independent experiments.

Figure 2:
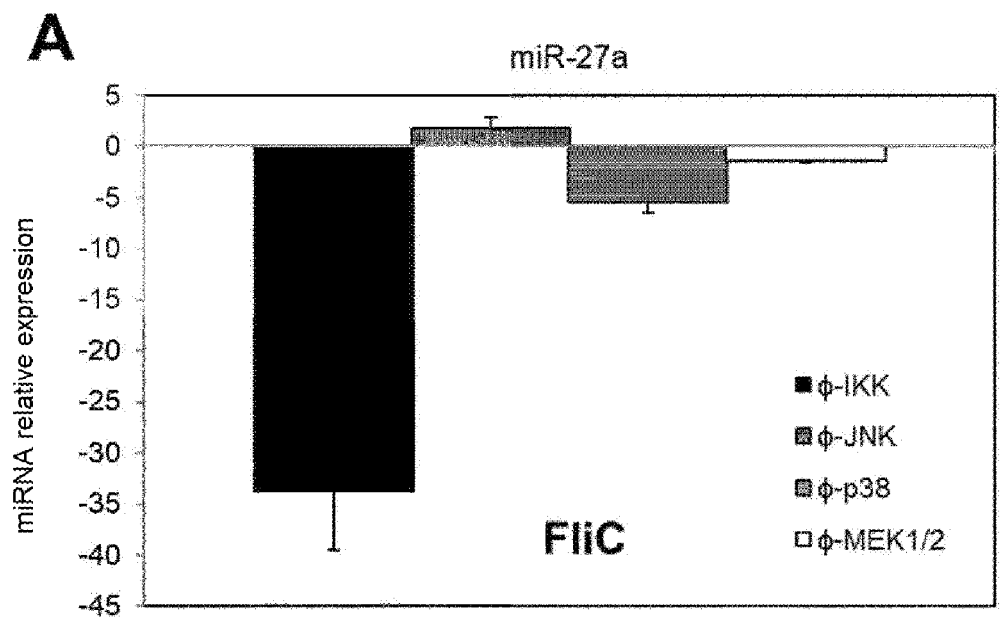
Figure 2:
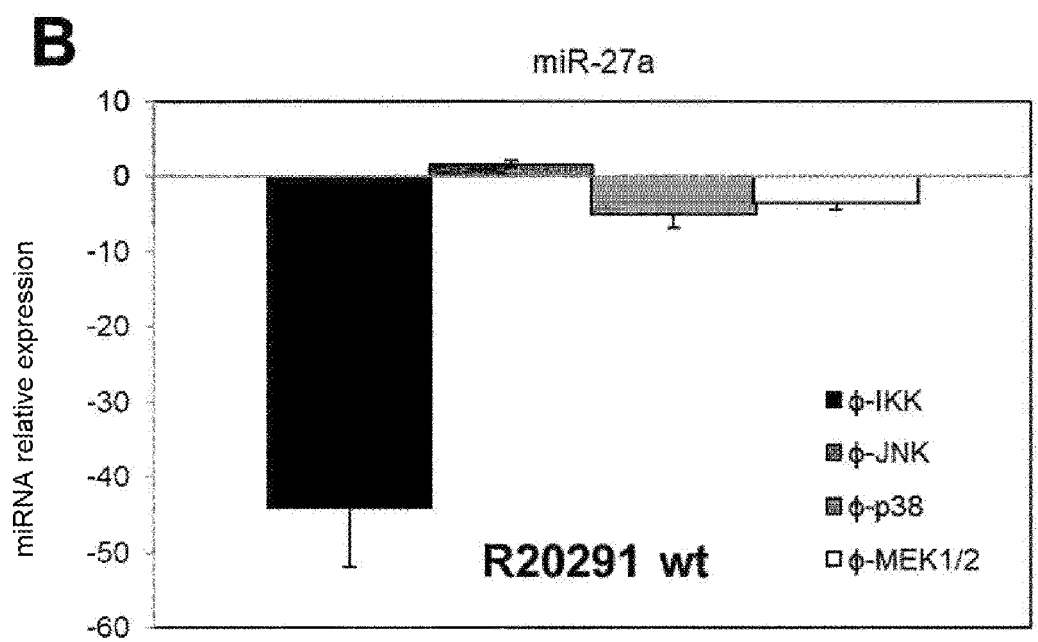

FIG. 2. inhibition of miR-27a-5p overexpression by specific chemical inhibitors of NF-kB and MAPKs in Caco-2 cells incubated with the flagellin FliC or *C. difficile* strain R20291. NF-κB and MAPKs pathways were inhibited 1 h before cell stimulation or infection with 20 µM BMS 345541 (IKKα inhibitor), 20 µM U0126 (MEK1/2 inhibitor), 20 µM PD98059 (MEK1 inhibitor), 20 µM SP600125 (JNK inhibitor), or 3 µM SB203580 (p38 inhibitor) to cell monolayers. miR-27a-5p expression was analyzed after incubation of cells with FliC (A) or infection with wild-type strain R20291 (WT) (B) for 1 h. miRNA expression was measured by qRT-PCR with the oligonucleotide of Table 1. Bars on each point correspond to standard deviations of means of at least 3 independent experiments.

Figure 3:
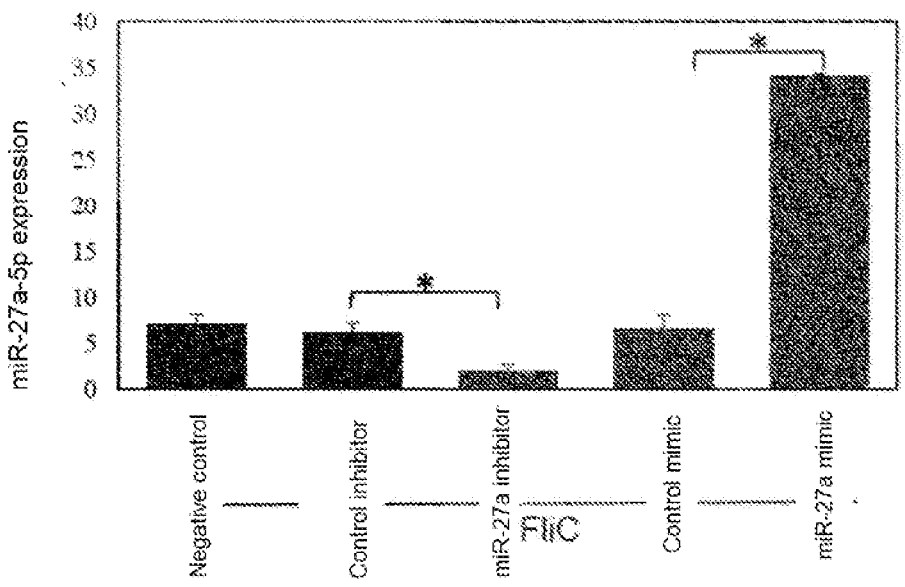
Figure 3:
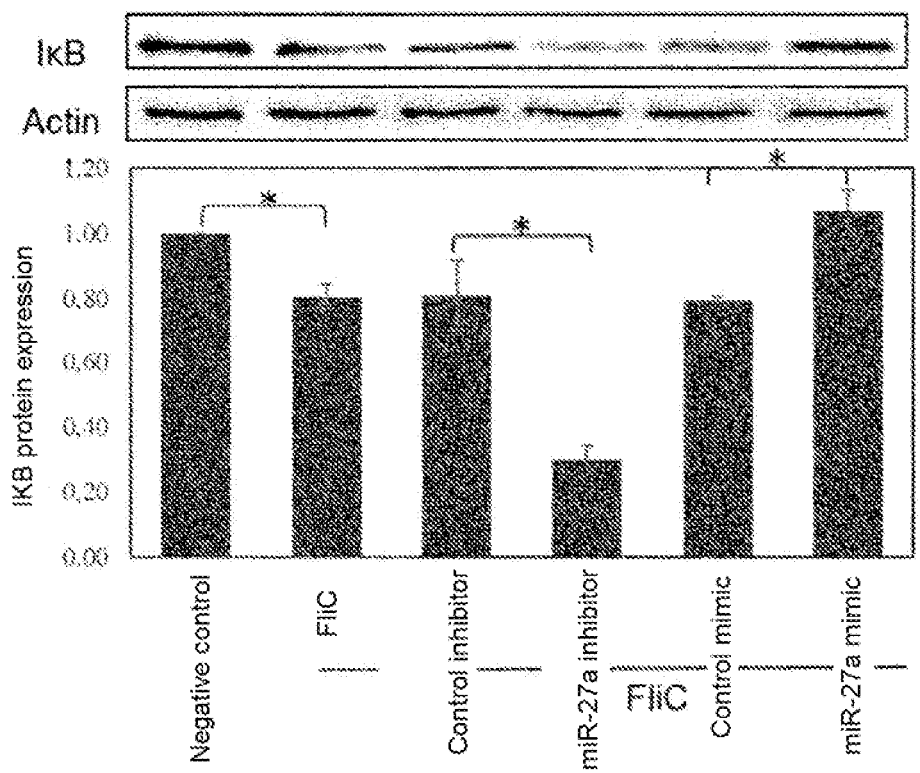
Figure 3:
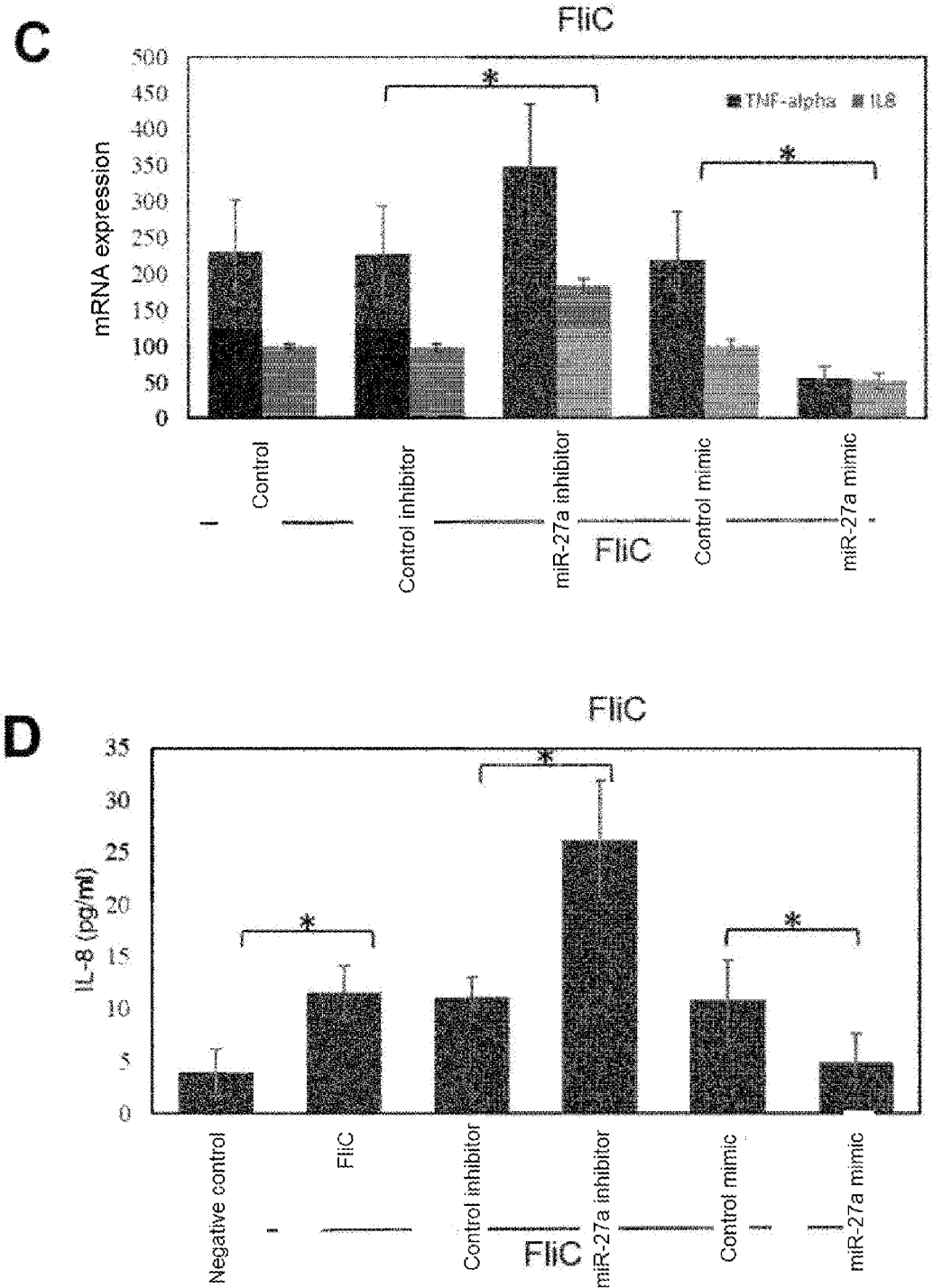

FIG. 3. Inhibitory effect of miR-27a-5p on the NF-κB pathway in Caco-2 cells incubated with flagellin. Caco-2 cells were transfected with the respective miR-27a-mimic, miR-27a inhibitor, as well as the respective oligonucleotide mimic and inhibitor controls. The expression of miR-27a-5p was measured by qRT-PCR with the oligonucleotide 5'-AGGGCTTAGCTGCTTGTGAG-3' (SEQ ID NO: 4). (A). Effector IκB-α degradation signaling NF-κB pathway activation was measured by Western blot (B). (C) Expression of pro-inflammatory cytokine TNFα and IL-8 mRNAs (oligonucleotides Table 2), as well as (D) IL-8 production in the cell culture supernatant by ELISA was also measured. Bars on each point are means±standard deviations, for at least 3 independent experiments (* p<0.01).

FIG. 4. miR-27a-5p expression in the cecum of *C. difficile*-infected mice. (A) mir-27a-5p expression measured by qPCR in the cecum of conventional microbiota mice infected with wild-type strain R20291 (WT) or with the isogenic non-flagellate mutant (FliC-). The third group corresponds to mir-27a-5p expression in tlr5$^{-/-}$ KO mice infected with the WT strain. Horizontal bars are the means per group. (B) Correlation of mir-27a-5p expression with KC mRNA expression (human IL-8 equivalent, oligonucleotides Table 2) in the cecum of conventional mice infected with strain R20291 WT.

FIG. 5. Protocol for miR-27a-5p-mimic treatment in the mouse model of CDI. Groups of 4- to 5-week-old female C57BL/6 mice with conventional microbiota are pretreated with an antibiotic cocktail added to the drinking water from D-6 to D-3 prior to D0 infection (0.4 mg/mL kanamycin, 0.035 mg/mL gentamycin, 850 U/mL colistin, 0.215 mg/mL metronidazole and 0.045 mg/mL vancomycin). At D-1, 0.2 mL of a clindamycin solution (1.25 mg/mL) is injected intraperitoneally (IP). On D0, mice are infected by oral gavage with 0.5 mL of a suspension containing $10^5$ spores of the wild-type strain (0.5 mL of sterile water for control mice). Mice in the treated groups then receive the miR-27a-5p mimic/in vivo-jetPEI® suspension in 3 doses of 50 µg (i.e., 25 mg/kg) at the time of infection, 8 h, and 24 h post-infection intravenously (150 µL injected retro-orbitally). The clinical status of the animals was observed, and at D2, the mice were sacrificed for cecal analysis.

FIG. 6. Cecal inflammation in *C. difficile*-infected mice. Groups of C57BL/6 mice with conventional microbiota (n=9-10) were infected and treated or not with the miR-27a-mimic. Ceca were collected at D2 post-infection. Representative whole cecum and histological section of (A, B) a control mouse (uninfected and treated with the miR-27a-mimic), (C, D) a mouse infected with wild-type R20291 WT and (E, F) a mouse infected with the same strain and treated with the miR-27a-mimic. (G) Histological inflammation scores (Table 3) for individual mice in each group. Horizontal lines represent the mean scores for A each group (score 0 for the control group not shown). The circle indicates the 3 animals that showed manifestations of CDI. (H) Western blots performed from cecal lysates revealed with an antibody directed against IκB-α and actin. The photograph represents a representative blot from one experiment. Band density is measured using the Fusion software and IκB-α/actin ratios were calculated. For the negative control, the ratio was normalized to 1 and the ratios of the other samples were carried over to the negative control. Bars on each point are means±standard deviations for each group of animals. * p<0.05.

EXAMPLES

Materials and Methods:
1. Bacterial Strains

Two strains of *C. difficile* were used in the infection of animal models: the wild-type strain R20291 (NAP1/027) and its isogenic mutant, in which the flagellin fliC gene is inactivated (ΔFliC). This mutated strain was constructed using the ClosTron technology (N. Minton, University of Nottingham), which consists of insertional gene inactivation [22]. Both strains are stored, as vegetative or spore forms, frozen at −80° C.

II. Purification of Recombinant *C. difficile* FliC Protein by Affinity Chromatography The flagellin FliC of *C. difficile* strain R20291 (NAP1/027) was produced in an *Escherichia coli* BL21 strain harboring the plasmid pET28 that encodes the FliC protein with an N-terminal histidine tail (FliC-His), previously constructed in the laboratory.

A preculture of *E. coli* BL21 pET28 in LB (Luria Bertani) medium, containing 50 µg/mL kanamycin (allowing plasmid maintenance) is diluted 1:100 in 2 L of the same medium and then incubated at 37° C. for 3 h. Induction of FliC-His synthesis is then performed by adding 1 mM isopropyl thiogalactoside (IPTG). After 3 h incubation at 37° C., the culture is centrifuged for 15 min at 4° C. at 4000 rpm. The pellet is then taken up in 50 mL of lysis buffer containing 25 mM Tris HCl pH 8, 300 mM NaCl, 1 mg/mL lysozyme (Sigma) and 500 µL of protease inhibitor P-8465 (Sigma). Lysis was performed at 4° C. for 1 h with shaking. Three freeze-thaw cycles at −80° C. followed by 5 sonication cycles of 45 s each are then performed to lyse the bacteria. The suspension is then centrifuged for 40 min at 10 000 g at 4° C. The pellet is taken up in 10 mL of equilibration buffer containing 50 mM $NaH_2PO_4$, 8 M urea and 300 mM NaCl.

The suspension is centrifuged for 40 min at 10 000 g and the supernatant is recovered and filtered on a 0.45 µm filter then put in contact for 1 h at 4C with 2 mL of Co++ divalent cation loaded resin (Talon®, Clontech) previously washed with 2 volumes of ultrapure water (Millipore®) and 3 volumes of equilibration buffer. Then the mixture is deposited on the column, the resin is washed 3 times with the equilibration buffer and the FliC-His protein is then eluted with 3 mL of elution buffer containing 45 mM $NaH_2PO_4$, 8 M urea, 270 mM NaCl and 150 mM imidazole. The eluate is then dialyzed against PBS at 4° C. using a Slide-A-Lyser® dialysis cassette (Thermo Scientific) allowing dialysis of molecules with a molecular weight lower than 10 000 Da.

After dialysis, a 12% polyacrylamide gel electrophoresis (SDS-PAGE), followed by a 0.25% Coomassie blue staining was performed to verify the purity of the sample. A standard range of bovine serum albumin (BSA) fraction V (Euromedex®) is also deposited on gel and the establishment of the calibration curve is carried out with the ImageJ software by measuring the density of the bands. Finally, the concentration of FliC-His is determined by measuring the density of the band corresponding to the recombinant protein, after deposition of 10 µL of eluate and calculated using the equation of the calibration curve.

III. Cell Culture

The Caco-2 (colonic adenocarcinoma) cell line was used. It is one of the most widely used cell models to model the intestinal epithelium in vitro. Caco-2 cells are human intestinal epithelial cells that express several TLRs, including TLR5. The line is cultured in Dulbecco's Modified Eagle Medium (DMEM®, Gibco) supplemented with 15% decomplemented fetal calf serum (FCS) and 1% non-essential amino acids (Gibco).

The cell line is stored in liquid nitrogen freezing ampoules at −120° C. in FCS supplemented with 10% DMSO (cryoprotectant). After thawing, cultures are performed in 25 and 75 cm² flasks and two subcultures are performed when cells are confluent. Cells are counted using a Malassez cell and then distributed into new dishes. Cultured cells are maintained in an incubator at 37° C. under an atmosphere containing 10% $CO_2$ and saturated with water vapor. The medium is changed 48 h after thawing and then each day. The search for *mycoplasma* contamination is performed by fixing the cell monolayers with Carnoy's fixative and then staining them with Hoechst reagent (Sigma) diluted 1:2000. The cell monolayers are then observed by fluorescence microscopy.

IV. Cell Infection and Treatment

Caco-2 cells are brought into contact with purified recombinant FliC-His protein from *C. difficile* R20291 or with *C. difficile* strains. Twenty-four-well plates are seeded with $5\times10^5$ cells per well and cells are then grown for up to 3 days post-confluence, before they reach polarization. Cells are depleted 4 h before contact with FliC or infection with the different *C. difficile* strains to avoid activation of signaling pathways, by washing with PBS and then adding 0.5 mL of DMEM medium supplemented with 1% FCS instead of 15%. The cell monolayers were then brought into contact with the FliC-His protein at a concentration of 10 ng/mL with incubation times of 1, 2, 4, 6, 8, 12, and 24 h. Caco-2 cells not brought into contact with FliC-His are the negative control for each study time. At the end of the incubation kinetics, the culture medium in each well is aspirated and the cells are directly lysed for RNA extraction. Each experiment is performed at least three times independently.

For infection of cells with *C. difficile*, wild type R20291 or the non-flagellated mutant strain of *C. difficile* is grown beforehand in liquid BHI medium in anaerobic chamber at 37° C. The bacterial suspension is centrifuged at 5000 rpm for 4 min, then washed with 10 mL of PBS. After another centrifugation at 5000 rpm for 4 min, the pellet is taken up in 500 µL of PBS, giving a bacterial suspension of $2\times10^9$ bacteria/mL. 250 µL of bacterial suspension is put in contact with the cells, i.e., a multiplicity of infection (MOI) of 50 bacteria/cell.

Where indicated, NF-κB and MAPKs pathways were chemically inhibited 1 h before cell stimulation or infection by adding to the cell monolayers 20 µM BMS 345541 (IKKα inhibitor) (Sigma), 20 µM U0126 (MEK1/2 inhibitor), 20 µM PD98059 (MEK1 inhibitor), 20 µM SP600125 (JNK inhibitor), or 3 µM SB203580 (p38 inhibitor) (Cell Signaling, Ozyme).

V. Overexpression and Inhibition of miR-27a-5p in Caco-2 Cells miR-27a-5p was overexpressed in cultured Caco-2 cells using 25 nM of Syn-hsa-miR-27a-5p mimic, whereas inhibition was achieved with 250 nM of Anti-hsa-miR-27a-5p, both purchased from Qiagen. Prior to transfection, Caco-2 cells were seeded in a 24-well plate at $6\times10^4$ cells/well and transfected with HiPerfect transfection reagent (Qiagen) according to the manufacturer's instructions. Cells were incubated with transfection complexes under their normal growth conditions and harvested 48 h after transfection. The miScript Inhibitor Negative Control and miScript Negative Control (Qiagen) were used as negative and positive controls, respectively. To monitor transfection efficiency, AllStars Hs Cell Death Control siRNA (Qiagen) was incorporated by transfection into cells in parallel in all transfections, and a transfection efficiency of at least 75% was achieved. When necessary, cells were stimulated with purified flagellin FliC for 1 h. The level of miR-27a-5p and the expression of interleukin 8 (IL-8) and TNFα genes were analyzed by quantitative RT-PCR (qRT-PCR), the level of IκB protein was assessed by Western blot, and the level of IL-8 in the cell supernatant was assayed by ELISA.

VI. Animal Model

The C57BL/6 mouse with conventional microbiota was used as an animal model of *C. difficile* infection (CDI). Four- to five-week-old female mice (Charles River Laboratories) are maintained in a sterile isolator, fed irradiated food and autoclaved water. Upon arrival of the animals, feces are collected to verify the absence of intestinal colonization by *C. difficile*.

In this infection model, mice were pretreated with an antibiotic cocktail added to the drinking water for 4 days (from D-6 to D-3 prior to D0 infection). This cocktail is composed of 0.4 mg/mL kanamycin, 0.035 mg/mL gentamycin, 850 U/mL colistin, 0.215 mg/mL metronidazole and 0.045 mg/mL vancomycin. Then, treatment was stopped for two days. One day before infection (D-1), 0.2 mL of a 1.25 mg/mL clindamycin solution was injected intraperitoneally (IP). At D0 (infection), mice were infected by oral gavage with 0.5 mL of a suspension containing $10^5$ spores of the wild-type or ΔFliC strain, whereas gavage of control mice was performed with 0.5 mL of sterile water.

The miR-27a-5p mimic solution used for treatment of mice was prepared by mixing the miR-27a-5p mimic (synthesized by Riboxx®, Germany) with an in vivo transfection reagent, in vivo-jetPEI® (Polyplus-Transfection®, France). After resuspension of lyophilized miR-27a-5p mimic in sterile Millipore water, 50 μg of miR-27a-5p mimic was diluted with sterile glucose solution (final glucose concentration of 5%); 6 μL of in vivo-jetPEI reagent was also diluted with sterile glucose solution (final glucose concentration of 5%), and then these two solutions were mixed volume-to-volume (final concentration of miR-27a-5p mimic 0.33 μg/L). Mice belonging to the infected and treated group were then treated with the miR-27a-5p mimic/ in vivo-jetPEI® suspension in 3 intravenous doses of 50 μg (i.e., 25 mg/kg) at the time of infection, 8 h, and 24 h post-infection (150 μL injected retro-orbitally).

Following infection, mice were kept under observation for 2 days and the clinical manifestations of CDI, diarrhea, bristling hair and reduced activity were recorded. Mice were also weighed daily to observe potential infection-related weight changes.

At D2 post-infection, mice were sacrificed and the cecum of each mouse was harvested, cut longitudinally to collect a sufficient amount of cecal contents to perform bacterial enumeration. The cecum was then washed in PBS, immersed in RNAlater solution (Qiagen) to stabilize RNA, and cut into three parts: one part for histological studies, another for immediate extraction of total RNA, and the last for protein extraction (for immunoblot).

VII. Bacterial Enumeration

The collected cecal contents were suspended in PBS at 10 mg/mL (stock solution). For enumeration of vegetative forms, a 1:10 dilution range in PBS was performed: 100 (1 mg/mL), $10^{-1}$ (0.1 mg/mL), $10^{-2}$ (0.01 mg/mL) and $10^{-3}$ (0.001 mg/mL). Thus, 100 μL of each dilution was inoculated on brain heart infusion (BHI) agar medium supplemented with 3% defibrinated horse blood and 0.4% Oxoid supplement (125 mg D-cycloserine and 4 mg Cefoxitin). For spore enumeration, the cecal contents were subjected to alcohol shock by incubating the stock solution with 1 volume of absolute ethanol for 10 min to kill vegetative forms. The resulting suspension was centrifuged for 10 min at 5000 rpm and the pellet was taken up in 1 volume of PBS. Then, a 1:10 dilution range was performed: 100 (1 mg/mL) and $10^{-1}$ (0.1 mg/mL). The stock solution and each dilution were inoculated on the same medium supplemented with 0.1% taurocholate (Sigma) for germination and enumeration of *C. difficile* spores. The media were incubated in an anaerobic controlled atmosphere chamber (atmosphere with 5% Hz, 5% $CO_2$ and 90% $N_2$) at 37° C. for 48 h.

VIII. RNA Extraction

The miRNeasy Mini® kit (Qiagen) allowed the extraction and purification of total RNAs including miRNAs from cell cultures of the Caco-2 line and from mouse cecal tissues, unlike the majority of commercial kits which do not allow the extraction of RNA molecules smaller than 200 nucleotides in size. This kit allows lysis of the samples based on the use of a phenol/guanidine mixture and then a purification of the total RNA thanks to a silica membrane column.

For RNA extraction from Caco-2 cells, the culture medium was aspirated from the wells where 700 μL of QiAzol was then added. QiAzol, a lysis agent, is a single-phase solution of phenol and guanidine thiocyanate that allows for cell lysis, inhibition of RNases, and removal of the majority of DNA and cellular proteins from the lysates by organic extraction. Lysis is continued by scraping the cell monolayers with a scraper and pumping the lysate back and forth several times with a micropipette. To reduce the viscosity of the lysate, the cells were then homogenized with a syringe and needle by pumping back and forth ten times.

Ceca collected from sacrificed mice were lysed, after addition of QiAzol, using the FastPrep® for automated sample homogenization in Lysing Matrix D® tubes (MP Biomedicals). The sample is mechanically ground by simultaneous and multidirectional impact of the Lysing Matrix D® beads for 40 s at speed 6.

The lysates were then incubated at room temperature for 5 min to allow dissociation of the nucleoprotein complexes. Next, 140 μL of chloroform was added to the tube, which was then shaken vigorously for 15 s, incubated for 3 min at room temperature, and followed by 15 min of centrifugation at 12 000 g at 4° C. allowing the formation of 3 phases: a clear aqueous phase containing RNA (in a volume of 350 μL), a white interphase containing DNA, and a red organic phase containing proteins. The aqueous phase was then transferred to a collection tube to which 525 μL of absolute ethanol (1.5 volume) was added to ensure the appropriate conditions for RNA binding to the column. The mixture thus obtained was transferred to a silica membrane column associated with a collection tube. The column was centrifuged for 15 s at over 8 000 g at room temperature and the supernatant was removed. Next, 700 μL of RWT® buffer was added to the same column, which was washed by centrifugation for 15 s at over 8 000 g, and the supernatant was removed. Two further washes were then performed with 500 μL of RPE® buffer by centrifugation for 15 s at over 8 000 g. Following the second wash in RPE® buffer, centrifugation for 2 min at over 8 000 g was performed to ensure the absence of ethanol during RNA elution. RNA elution was performed by adding 40 μL of RNase-free water to the column, followed by centrifugation for 1 min at over 8 000 g.

Finally, the total RNA extracted was quantified using a Nanodrop® spectrophotometer (ND-2000) by depositing 2 μL of sample. This analysis also allows the calculation of the absorbance ratio at 260 and 280 nm (A260/A280) and the absorbance ratio at 260 and 230 nm (A260/A230), allowing the evaluation of the purity of the nucleic acids present in each sample. The integrity of the total RNA extracted was also assessed by analysis with the Agilent® Bioanalyzer and measurement of the RNA Integrity Number (RIN) value.

IX. Analysis of miRNA Expression by Real-Time PCR

IX.1. Synthesis of the Complementary DNA (cDNA)

Mature miRNAs are naturally composed of about 22 nucleotides and, unlike mRNAs, are not polyadenylated. For this reason, cDNA synthesis was performed using the miScript RT II® kit (Qiagen) containing reverse transcriptase and poly(A)-polymerase, a nucleic acid mix (containing dNTPs, rATP, oligo-dT primers and synthetic RNA serving as an internal control), in order to evaluate the RT performance and the "miScript HiSpec" buffer allowing selective conversion of mature miRNAs into cDNA. Polyadenylation and reverse transcription thus took place in parallel in the same tube. Mature miRNAs are polyadenylated by poly(A)-polymerase and reverse transcribed into cDNA using oligo-dT primers. These primers have a 3' degenerate anchor and a universal tag sequence at its 5' end allowing amplification of mature miRNAs during qPCR. The combination of polyadenylation and the addition of the universal tag ensures that no genomic DNA is detected.

A mix consisting of 4 µL HiSpec 5× miScript buffer, 2 µL 10× miScript Nucleics mix, and 2 µL "miScript Reverse Transcriptase" mix was added to 2 µg of total RNA and cDNA synthesis was performed in a final volume of 20 µL. The reaction is carried out at 37° C. for 1 h, and then the enzymes were inactivated by a 5 min incubation at 95° C. Samples were diluted 1:10 and stored at −20° C. before PCR amplification.

IX.2. Quantitative PCR (qPCR)

The primers used are shown in Table 1. PCR was performed with the miScript SYBR® Green PCR kit (Qiagen®) on the CFX96 thermocycler (Bio-Rad). The kit contains the reverse primers (universal primer) and a master mix containing the intercalant (SYBR Green) and the HotStarTaq DNA polymerase enzyme. PCRs were performed in a final volume of 10 IL, comprising 1 µL of a diluted cDNA template solution, 9 µL of mixture consisting of the PCR reagent (master mix and universal primers) and the specific primers of each cDNA corresponding to the target miRNAs at the final concentration of 0.5 µM. The thermal program included, for all targets studied, an initial 15 min HotStarTaq DNA polymerase enzyme activation step at 95° C., followed by 40 cycles each including 15 s denaturation at 94° C., 30 s hybridization at 55° C. and 30 s extension at 70° C. The amplification was followed by a melting step, allowing the determination of the melting temperature, or Tm, of each amplicon, consisting of denaturation for 1 min at 95° C., strand reassociation for 2 min at 65° C., and then slow melting by heating to 95° C. at a rate of 0.5° C. per second.

PCR results are expressed as cycle threshold (Ct) values corresponding to the number of amplification cycles required for the fluorescence to exceed the detection threshold of the fluorometer. The results obtained were expressed as relative expression.

The qRT-PCRs for cytokine gene expression analysis were performed under the same conditions using the oligonucleotides listed in the following Table 2.

TABLE 2

Oligonucleotides used for qRT-PCR analyses of mRNA expression.

| Gene | Oligonucleotide | SEQ ID NO: |
|---|---|---|
| hTNF-α | F'-CGAGTGACAAGCCTGTAGCC | 28 |
|  | R'-GTTGACCTTGGTCTGGTAGG | 29 |
| hIL-8 | F'-GGCACAAACTTTCAGAGACAG | 30 |
|  | R'-AAATTTGGGGTGGAAAGGTT | 31 |
| hACTIN | F'-AGAAAATCTGGCACCACACC | 32 |
|  | R'-AGAGGCGTACAGGGATAGCA | 33 |
| mKC(IL-8) | F'-GCTGGGATTCACCTCAAGAA | 34 |
|  | R'-AGGTGCCATCAGAGCAGTCT | 35 |
| mGAPDH | F'-GAACTGGCAGAAGAGGCACT | 36 |
|  | R'-AGGGTCTGGGCCATAGAACT | 37 | h = human; m = murine. Actin and GAPDH genes were used for normalization

X. Analysis of NF-κB Signaling Pathway Activation by Immunoblot

X.1. Protein Extraction

The piece of cecal tissue (about 70 g) was placed in 600 µL of lysis buffer (62 mM Tris pH 6.8, 10% glycerol, 1.5% SDS, 0.25% bromophenol blue) in Lysing Matrix® tubes (MP Biomedicals) containing ceramic beads. Tissues were ground under mechanical homogenization with the FastPrep-24® instrument (MP Biomedicals). The samples were then stored at −20° C. before analysis.

TABLE 1

Primers used for qRT-PCR for miRNAs.

|  | Targets | SEQ ID NO: | 5'-3' sequence | Reference |
|---|---|---|---|---|
| human miRNAs | hsa-let-7i-5p | 5 | TGAGGTAGTAGTTTGTGCTG | (31) |
|  | hsa-miR-9-5p | 6 | TCTTTGGTTATCTAGCTGTATGA | (32) |
|  | hsa-miR-18a-5p | 7 | TAAGGTGCATCTAGTGCAGAT | (31) |
|  | hsa-miR-19a-3p | 8 | TGTGCAAATCTATGCAAAACTG | miRgator |
|  | hsa-miR-27a-5p | 9 | AGGGCTTAGCTGCTTGTGAG | (31) |
|  | hsa-miR-129-5p | 10 | CTTTTTGCGGTCTGGGCTTG | (31) |
|  | hsa-miR-132-5p | 11 | ACCGTGGCTTTCGATTGTTAC | (33) |
|  | hsa-miR-147-3p | 12 | GTGTGTGGAAATGCTTCTGC | (34) |
|  | hsa-miR-150-5p | 13 | TCTCCCAACCCTTGTACCAG | Target scan |
|  | hsa-miR-155-5p | 14 | TTAATGCTAATCGTGATAGGGGT | (35) |
|  | hsa-miR-212-5p | 15 | ACCTTGGCTCTAGACTGCTTA | (31) |
|  | hsa-miR-300-5p | 16 | TATACAAGGGCAGACTCTTC | miRgator |
|  | hsa-miR-301a-3p | 17 | CAGTGCAATAGTATTGTCAAAGC | (36) |
|  | hsa-miR-339-5p | 18 | TCCCTGTCCTCCAGGAGCTC | (31) |
|  | hsa-miR-382-5p | 19 | GAAGTTGTTCGTGGTGGATTC | miRwalk |
|  | hsa-miR-378a-5p | 20 | CTCCTGACTCCAGGTCCTGT | (31) |
|  | hsa-miR-431-5p | 21 | TGTCTTGCAGGCCGTCATGC | (31) |
|  | hsa-miR-520a-5p | 22 | CTCCAGAGGGAAGTATTTCT | miRwalk |
|  | hsa-miR-524-5p | 23 | CTACAAAGGGAAGCACTTTCTC | miRwalk |
|  | hsa-miR-525-5p | 24 | CTCCAGAGGGATGCACTTTC | miRwalk |
|  | hsa-miR-548d3p | 25 | TAGCAAAAACTGCAGTTACTT | miRwalk |
|  | hsa-miR-4766-5p | 26 | TCTGAAAGAGCAGTTGGTGT | Target scan |
| Normalization gene | SNORD2 | 27 | TCATCTTTCGGGACTGACCTG | (37) |

X.2 Polyacrylamide Gel Electrophoresis (SDS-PAGE) of Proteins

After denaturing the samples (100° C. in a water bath for 10 min), the proteins were then separated on a 12% polyacrylamide gel under denaturing conditions (SDS-PAGE). Eight (8) μL of samples was deposited per well; 5 μL of molecular weight marker (PageRuler® Plus Prestained Protein Ladder, ThermoScientific) was also deposited on each gel. Migration was performed at constant voltage (200 V) for 60 min in migration buffer (25 mM Tris, 0.1% SDS, 192 mM glycine).

X.3. Transfer and Immunoblot

The polyvinylidene difluoride (PVDF) membrane was regenerated with methanol, then the proteins were transferred at constant amperage at 350 mA for 1 h into the transfer buffer (20 mM Tris, 150 mM glycine). Immunostaining with the IκB-α protein was then performed followed by chemiluminescence detection. Following transfer, the membrane was saturated in a mixture of TBS (0.5 M Tris, 1.5 M NaCl) supplemented with 0.1% Tween 20 and 5% milk for 1 h. Membranes were incubated overnight at 4° C. with a first specific antibody (Ab) directed against the IκB-α protein (anti-IkB-α, rabbit Ab) or against actin (mouse Ab) (Cell Signaling®). These antibodies were diluted 1:2000 in TBS supplemented with 0.1% Tween 20 and 5% BSA. Then, the membranes were washed 3 times for 10 min in TBS supplemented with 0.1% Tween 20. They were then incubated for 1 h at room temperature, with shaking, with a $2^{nd}$ peroxidase-coupled rabbit Ab (IgG anti-rabbit HRP linked antibody, Cell Signaling®) or mouse Ab (IgG anti-mouse HRP linked antibody, Cell Signaling®). Membranes were washed 3 times for 10 min, then incubated 1-5 min with Immobilon TM Western Chemiluminescent HRP Substrate® reagent. Membranes were developed and images analyzed with the Fusion® instrument (Viber Lourma), with normalization by actin. Band density was measured using the Fusion software and IκB-α/actin ratios were calculated. For the negative control, the ratio was normalized to 1 and the ratios of the other samples were carried over to the negative control for each experiment.

XI. Histological Analysis

Cecal tissue pieces were preserved in formalin solution for 24 hours and then transferred to 70% ethanol. Histological sections and hematoxylin and eosin staining were performed in the Clamart Mouse Histology Immunopathology Platform of the Paris Saclay Institute of Therapeutic Innovation IPSIT (PHIC-32 rue des carnets, Clamart 92140, France).

Microscopic analysis of the slide preparations was performed using the NDP View® software (Hamamatsu). A score of the degree of inflammation was established on the basis of submucosal edema, inflammatory infiltrate, epithelial lesions and loss of mucus cells (goblet cells). Table 3.

TABLE 3

Inflammation score used in histological analysis of ceca.

1. Edema

0 Absence of edema
1 Minimal edema with minimal multifocal submucosal expansion (<2×)
2 Moderate edema with multifocal submucosal expansion at 2-3×
3 Severe edema with multifocal submucosal expansion >3×
4 Score 3 with diffuse submucosal expansion 2. Cellular infiltrate (400×)

0 Absence of inflammation (0-5 cells)
1 Minimal multifocal neutrophilic inflammatory infiltrate (6-20 cells)
2 Moderate multifocal neutrophilic inflammatory infiltrate (submucosal involvement) (21-60 cells)
3 Severe multifocal neutrophilic inflammatory infiltrate (significant submucosal involvement that may involve the entire wall (61-100 cells)
4 Score 3 with significant wall abscesses (>100 cells)

3. Epithelial lesion

0 Absence of epithelial lesion
1 Minimal superficial multifocal epithelial lesion. Epithelial desquamation
2 Moderate superficial multifocal epithelial lesion. Mucosal erosion (maintenance of architecture or loss of 1-10 cells).
3 Severe superficial multifocal epithelial lesion +/− pseudomembranes. Mucosal ulceration (destruction of the lamina propria or loss of >10 cells).
4 Score 3 with significant pseudomembranes or epithelial ulceration (complete focal loss of epithelium)

4. Loss of caliciform cells (mucus cells) (400×)

0 >28
1 11-28
2 1-10
3 <1

XII. Cytokine Assays by ELISA

Levels of the pro-inflammatory cytokine IL-8 in Caco-2 cell culture supernatants were assessed by ELISA using the Human IL-8 ELISA KIT (4Abio, China) according to the manufacturer's instructions. The limit of detection was 4 μg/mL.

XIII. Statistical Test

Means±standard deviations of the variables studied were obtained from the three replicates; statistical analysis of the results was performed by the Mann-Whitney test. Values of $p<0.01$ or $p<0.05$ were considered statistically significant.

Results:

1. In silico search for miRNAs potentially involved in the regulation of the inflammatory response induced by C. difficile and its flagellin FliC The results of recent work shows that C. difficile and its flagellin FliC induce a pro-inflammatory response in intestinal epithelial cells and in the mouse cecum (mouse model of CDI), and that the NF-κB signaling pathway is a predominant pathway [16, 17]. Since miRNAs are able to modulate signaling pathways by acting on mRNA, the role of these molecules has been studied in the regulation of the pro-inflammatory NF-κB signaling pathway induced by the interaction of the flagellin FliC with its specific receptor TLR5 (innate response receptor) during CDI.

An in silico search was performed using 3 different target prediction algorithms for miRNAs used by the miRGator, TargetScan and miRWalk databases. These online algorithms are based on the search for similarity between the 3' UTR region of the mRNA sequence of interest and the seed sequence of the miRNAs present in the databases specific to each library. Scientific publications indicating a link between miRNAs and different effectors of TLR5 signaling following stimulation by bacterial flagella were also taken into account.

One hundred and thirteen (113) miRNAs were selected based on the criteria selected from these in silico searches and the literature. Among these miRNAs, twenty or so miRNAs (Table 1) were tested to evaluate their expression kinetics in Caco-2 cells brought into contact with the *C. difficile* flagellin FliC, more particularly during the first hours of contact. Among all these miRNAs tested, the miRNA "miR-27a-5p" showed significant overexpression, in particular during the first hours of incubation (FIG. 1A). Its overexpression was confirmed when cells were infected with *C. difficile* strain R20291 at 2 h of incubation, whereas no overexpression was observed when cells were infected with the non-flagellate mutant (FIG. 1B).

II. MiR-27a-5p Plays a Role in the NF-κB Pro-Inflammatory Signaling Pathway Induced by *C. Difficile* and its Flagellin FliC.

In order to analyze the impact of NF-κB and MAPKs (ERK1/2, p28, and JNK) signaling pathway inhibition on the expression of the identified miRNA, these pathways were chemically inhibited by specific inhibitors of IKKα (NF-κB pathway), and MAPKs ERK1/2, p38, and JNK 1 h before stimulation of the cells by FliC or bacteria. After 2 h of incubation of cells with FliC or strain R20291, miRNA-27a-5p expression was abolished (FIGS. 2A and B). A much stronger (roughly 40-fold) inhibition of miR-27a-5p expression was achieved using the IKKα inhibitor (BMS 345541) demonstrating that this miRNA plays a role in the regulation of the pro-inflammatory NF-κB signaling pathway induced by *C. difficile* and its flagellin (FIGS. 2A and B).

III. MiR-27a-5p-Mimic Inhibits the Pro-Inflammatory NF-κB Signaling Pathway Induced by *C. Difficile* and its Flagellin FliC In Vitro.

The previous results demonstrate that miR-27a-5p (SEQ ID NO: 1=AGGGCUUAGCUGCUUGUGAGCA), the expression of which is induced by *C. difficile* and its flagellin FliC via NF-κB activation, plays a role in the regulation of this NF-κB pathway. The role of miR-27a-5p was characterized to reveal whether it is an activator (pro-inflammatory) or inhibitor (anti-inflammatory) of the NF-κB pathway. To this end, different molecules were used: a molecule (oligonucleotide) mimicking the activity of this mR-27a-5p ("mR-27a mimic") or a chemical molecule antagonizing its activity ("miR-27a-inhibitor"=Anti-hsa-miR-27a-5p).

After transfection of Caco-2 cells with these two molecules, as well as with the control oligonucleotides and inhibitors, miR-27a-5p expression was measured after cell lysis. As indicated in FIG. 3A, the miR-27a-5p inhibitor significantly reduced the expression of this miRNA in FliC-stimulated cells, whereas the miR-27a mimic was highly expressed. The effect of transfecting cells with these two molecules was measured with respect to the degradation of effector IκB-α signaling the activation of the NF-κB pathway, the expression of mRNAs of the pro-inflammatory cytokines TNFα and IL-8, and the production of IL-8 in the cell culture supernatant.

Anti-miR-27a-5p (miR-27a inhibitor) induces strong degradation of IκB-α, increased expression of TNFα and IL-8 cytokine mRNAs, as well as increased IL-8 synthesis in the culture supernatant (FIGS. 3B, C and D), suggesting that miR-27a-5p plays an inhibitory role in the NF-κB pathway and thus an anti-inflammatory role in the signaling cascade induced by FliC-TLR5 interaction.

Quite consistent with these observations, transfection of cells with the miR-27a mimic induced an anti-inflammatory cellular response characterized by the absence of IκB-α degradation and thus NF-κB activation, strong inhibition of mRNA expression of the cytokines TNFα and IL-8, and absence of IL-8 synthesis in the cell supernatant (FIGS. 3B, C and D). The whole of these observations indicate that miR-27a-5p plays an inhibitory role in the NF-κB pro-inflammatory pathway following activation of this pathway by the flagellin-TLR5 interaction. This miRNA would be involved in a feedback loop of the TLR5-NF-κB signaling cascade.

Iv. MiR-27a-5p is Highly Overexpressed In Vivo in the Cecum of *C. difficile*-Infected Mice.

In order to confirm the observations made in vitro regarding the potential role of miR-27a-5p in the regulation of inflammation induced by *C. difficile* and its flagellum, the expression of this miR-27a-5p was analyzed in the intestine (cecum) during infection in the mouse model of CDI.

Two groups of 4- to 5-week-old female C57BL/6 mice with conventional microbiota (n=10 for each group) and one group of C57BL/6 tlr5 KO mice (not expressing TLR5, n=10) were formed. After antibiotic treatment of the animals for 6 days prior to infection to create dysbiosis (see Materials and Methods), one group of conventional microbiota mice was infected by intragastric gavage with wild-type *C. difficile* strain R20291 (WT) and another with the isogenic mutant lacking flagella (FliC-). One group of tlr5$^{-/-}$ KO mice was also infected with the WT strain. A group of uninfected mice served as a control to establish relative expression ratios for each group. Analysis of miR-27a-5p expression in the cecum of the animals showed higher expression of this miRNA in the cecum of conventional microbiota C57BL/6 mice infected with the WT strain, compared with the expression observed in mice infected with the non-flagellate mutant (FliC-) and that of tlr5 KO mice infected with the WT strain (FIG. 4A). These results indicate that the *C. difficile* flagellum through its interaction with TLR5 plays a role in the increased expression of miR-27-a-5p in the mouse cecum, suggesting that, in vivo, NF-κB activation as a result of the flagellum-TLR5 interaction previously reported [17], correlates with miR-27a-5p expression.

Furthermore, analysis of mouse KC cytokine gene mRNA expression, equivalent to human IL-8, reveals a perfect correlation with the increased expression of miR-27a-5p as indicated in FIG. 4B.

V. A miR-27a-5p Mimic Reduces the Severity of Inflammation In Vivo in the Mouse Model of CDI.

Given the anti-inflammatory effects induced by miR-27a-5p in Caco-2 cells, the in vivo effect of an oligonucleotide mimic of this miRNA (miR-27a-5p-mimic) was analyzed. This oligonucleotide was administered intravenously (IV) in the mouse model of CDI (FIG. 5). Three groups of 4 to 5-week-old female C57BL/6 mice with conventional microbiota (n=9-10 for each group) were tested. After dysbiosis-inducing antibiotic treatment, one group of uninfected animals was treated intravenously with miR-27a-5p mimic/in vivo-jetPEI® suspension at 3 doses of 50 µg (i.e., 25 mg/kg) at the time of infection, 8 h, and 24 h post-infection (150 µL injected retro-orbitally). A second group of animals was infected with wild-type strain R20291 and not treated with miR-mimic and a third group was also infected with this *C. difficile* strain but treated with miR-27a-5p mimic/in vivo-jetPEI® suspension as for the first group.

Following infection, as expected in this model of CDI, mice infected and not treated with the miR-27a-mimic developed clinical signs of CDI: diarrhea, bristly hair and decreased activity at D1 and D2 post-infection (Table 4). Only 3 out of 10 animals in the infected group treated with miR27-a-mimic developed diarrhea, and this was at D2 post-infection. It should be noted that the rate of intestinal colonization of infected animals quantified by bacterial count in the cecal contents (colony forming units—CFU/g) at D2 post-infection is quite equivalent between the groups of infected mice (untreated WT and WT+miR-27a-mimic) excluding the possibility that the difference in clinical manifestations between these two groups is the result of low intestinal colonization of mice.

TABLE 4

Clinical manifestations of animals infected and/or treated with the miR-27a-mimic at D1 and D2 post-infection.

| Group of animals | Diarrhea D1 | Diarrhea D2 | Bristly hair D1 | Bristly hair D2 | Reduced activity D1 | Reduced activity D2 |
|---|---|---|---|---|---|---|
| Negative control + miR-27a-mimic (n = 9) | 0/9 | 0/9 | 0/9 | 0/9 | 0/9 | 0/9 |
| WT (n = 9) 1.8 × 10$^9$ CFU/g | 9/9 | 9/9 | 3/9 | 3/9 | 3/9 | 3/9 |
| WT + miR-27a-mimic (n = 10) 3.7 × 10$^9$ CFU/g | 0/10 | 3/10 | 0/10 | 0/10 | 0/10 | 1/10 |

At D2 post-infection, pathological analysis of the cecum of wild-type infected and untreated animals showed an inflammatory hyperemic appearance with hemorrhagic areas and mucosal cecal content compared with the normal cecum of uninfected mice (negative control) as shown in FIGS. 6A and C. The inflammatory appearance of the cecum was largely attenuated in the miR-27a-mimic-treated group of infected mice (FIG. 6E). Regarding the histological study of cecal sections, as expected, significant mucosal edema with inflammatory infiltrate, epithelial erosion, and loss of goblet cells are found in the cecum of wild-type infected and miR-27a-mimic untreated mice, with an inflammation score (Table 3) ranging from 6 to 9, compared with a score of 0 for uninfected mice (FIG. 6G). In contrast, in the group of infected animals treated with miR-27-a-mimic, 6 of 10 mice had a cecum with little or no evidence of inflammation and normal, mucus-free cecal contents (FIG. 6E). The histologic score of inflammation was less than 6 for these animals, which showed mainly cellular infiltrate and mild to moderate edema (FIGS. 6F and G). The 3 mice in this "infected and mimic-treated" group that showed diarrhea at D2 post-infection (Table 4) had a high inflammation score comparable to infected and untreated mice (FIG. 6G), bringing the efficacy rate of miR-27a-5p to 70% in this mouse model of infection.

Analysis of NF-κB pathway activation in the cecal tissue at D2 post-infection revealed a strong degradation of IκB-α in the cecum of infected and untreated mice compared with uninfected mice, which is consistent, as for the clinical manifestations, with the usual observations in this model of CDI [17]. In contrast, no activation of IκB-α was detected in the cecum of miR-27a-mimic-treated infected mice (FIG. 6H), which reinforces previous observations of reduced clinical manifestations and intestinal inflammatory phenomena associated with infection with the bacterium in this mouse model.

CONCLUSION

In conclusion, the present work highlights the major role of a miRNA, miR-27a-5p, in decreasing the inflammatory response induced by the toxins and flagella of *C. difficile* bacteria and thus preventing or decreasing the mucosal damage caused by this inflammation. By inhibiting the NF-κB signaling pathway activated by the flagellum-TLR5 interaction during intestinal infection with *C. difficile*, this miRNA impacts the clinical presentation and prognosis of CDI.

The in vivo effect of a specific miR-27a-5p-mimic targeting the *C. difficile*-induced pro-inflammatory TLR5-NF-κB signaling pathway was demonstrated in a mouse model of CDI. This molecule is able to reduce the deleterious response of *C. difficile*-infected mice by decreasing the intestinal inflammatory response in these mice. These results demonstrate that it is possible to reduce the severe deleterious effects of infection with this bacterium by using this miRNA as an active principle in a therapeutic composition.

BIBLIOGRAPHIC REFERENCES

1. Cloud, J. and C. P. Kelly, *Update on Clostridium difficile associated disease*. Curr Opin Gastroenterol, 2007. 23(1): p. 4-9.
2. Heinlen, L. and J. D. Ballard, *Clostridium difficile infection*. Am J Med Sci, 2010. 340(3): p. 247-52.
3. Dubberke, E. R. and M. A. Olsen, *Burden of Clostridium difficile on the healthcare system*. Clin Infect Dis, 2012. 55 Suppl 2: p. S88-92.
4. Miller, M. A., et al., *Morbidity, mortality, and healthcare burden of nosocomial Clostridium difficile-associated diarrhea in Canadian hospitals*. Infect Control Hosp Epidemiol, 2002. 23(3): p. 137-40.
5. Carrico, R. M., *Silent menace. C. difficile and its threat to health care facilities*. Health Facil Manage, 2011. 24(6): p. 43-5.
6. Dubberke, E. R. and A. I. Wertheimer, *Review of current literature on the economic burden of Clostridium difficile infection*. Infect Control Hosp Epidemiol, 2009. 30(1): p. 57-66.
7. O'Brien, J. A., et al., *The emerging infectious challenge of Clostridium difficile-associated disease in Massachusetts hospitals: clinical and economic consequences*. Infect Control Hosp Epidemiol, 2007. 28(11): p. 1219-27.
8. Rebmann, T. and R. M. Carrico, *Preventing Clostridium difficile infections: an executive summary of the Association for Professionals in Infection Control and Epidemiology's elimination guide*. Am J Infect Control, 2011. 39(3): p. 239-42.
9. McGlone, S. M., et al., *The economic burden of Clostridium difficile*. Clin Microbiol Infect, 2012. 18(3): p. 282-9.
10. Kuijper, E. J., B. Coignard, and P. Tull, *Emergence of Clostridium difficile-associated disease in North America and Europe*. Clin Microbiol Infect, 2006. 12 Suppl 6: p. 2-18.

11. Wiegand, P. N., et al., *Clinical and economic burden of Clostridium difficile infection in Europe: a systematic review of healthcare-facility-acquired infection.* J Hosp Infect, 2012. 81(1): p. 1-14.
12. Eckert, C. and F. Barbut, [*Clostridium-difficile-associated infections*]. Med Sci (Paris), 2010. 26(2): p. 153-8.
13. Kuehne, S. A., et al., *The role of toxin A and toxin B in Clostridium difficile infection.* Nature, 2010. 467(7316): p. 711-3.
14. Lyras, D., et al., *Toxin B is essential for virulence of Clostridium difficile.* Nature, 2009. 458(7242): p. 1176-9.
15. Tasteyre, A., et al., *Role of FliC and FliD flagellar proteins of Clostridium difficile in adherence and gut colonization.* Infect Immun, 2001. 69(12): p. 7937-40.
16. Batah, J., et al., *Clostridium difficile flagella predominantly activate TLR5-linked N F-kappaB pathway in epithelial cells.* Anaerobe, 2016. 38: p. 116-24.
17. Batah, J., et al., *Clostridium difficile flagella induce a pro-inflammatory response in intestinal epithelium of mice in cooperation with toxins.* Sci Rep, 2017. 7(1): p. 3256.
18. Bentwich, I., et al., *Identification of hundreds of conserved and nonconserved human microRNAs.* Nat Genet, 2005. 37(7): p. 766-70.
19. He, X., Z. Jing, and G. Cheng, *MicroRNAs: new regulators of Toll-like receptor signalling pathways.* Biomed Res Int, 2014. 2014: p. 945169.
20. Taganov, K. D., et al., *NF-kappaB-dependent induction of microRNA miR-146, an inhibitor targeted to signaling proteins of innate immune responses.* Proc Natl Acad Sci USA, 2006. 103(33): p. 12481-6.
21. Bader, A. G., et al., *Developing therapeutic microRNAs for cancer.* Gene Ther, 2011. 18(12): p. 1121-6.
22. Minton, N., et al., *The development of Clostridium difficile genetic systems.* Anaerobe, 2004. 10(2): p. 75-84.
23. Häsler R, et al. 2012. Microbial pattern recognition causes distinct functional micro-RNA signatures in primary human monocytes. PloS One 7:e31151.
24. Norman E Buroker X-H N. 2013. Medical Diagnostic Methods Circulating miRNAs from Dried Blood Spots are Associated with High Altitude Sickness.
25. Romay M C, et al. 2015. Regulation of NF-κB signaling by oxidized glycerophospholipid and IL-1β induced miRs-21-3p and -27a-5p in human aortic endothelial cells. J Lipid Res 56:38-50.
26. Nahid M A, et al. 2013. Regulation of TLR2-mediated tolerance and cross-tolerance through IRAK4 modulation by miR-132 and miR-212. J Immunol Baltim Md 1950 190:1250-1263.
27. Liu G, et al. 2009. miR-147, a microRNA that is induced upon Toll-like receptor stimulation, regulates murine macrophage inflammatory responses. Proc Natl Acad Sci USA 106:15819-15824.
28. Ceppi M, et al. 2009. MicroRNA-155 modulates the interleukin-1 signaling pathway in activated human monocyte-derived dendritic cells. Proc Natl Acad Sci USA 106:2735-2740.
29. Lu Z, et al. 2011. miR-301a as an NF-κB activator in pancreatic cancer cells. EMBO J 30:57-67.
30. Wang B, et al. 2011. Systematic Evaluation of Three microRNA Profiling Platforms: Microarray, Beads Array, and Quantitative Real-Time PCR Array. PLoS ONE 6:e17167.
31. Hasler R, et al. 2012. Microbial pattern recognition causes distinct functional micro-RNA signatures in primary human monocytes. PloS One 7:e31151.
32. Norman E Buroker X-HN. 2013. Medical Diagnostic Methods Circulating miRNAs from Dried Blood Spots are Associated with High Altitude Sickness.
33. Nahid M A, et al. 2013. Regulation of TLR2-mediated tolerance and cross-tolerance through IRAK4 modulation by miR-132 and miR-212. J Immunol Baltim Md 1950 190:1250-1263.
34. Liu G, et al. 2009. miR-147, a microRNA that is induced upon Toll-like receptor stimulation, regulates murine macrophage inflammatory responses. Proc Natl Acad Sci USA 106:15819-15824.
35. Ceppi M, et al. 2009. MicroRNA-155 modulates the interleukin-1 signaling pathway in activated human monocyte-derived dendritic cells. Proc Natl Acad Sci USA 106:2735-2740.
36. Lu Z, et al. 2011. miR-301a as an NF-κB activator in pancreatic cancer cells. EMBO J 30:57-67.
37. Wang B, et al. 2011. Systematic Evaluation of Three microRNA Profiling Platforms: Microarray, Beads Array, and Quantitative Real-Time PCR Array. PLoS ONE 6:e17167.
38. Martimprey H et al, 2010. New Core-Shell nanoparticles for the intravenous delivery of siRNA to experimental thyroid papillary carcinoma, Pharmaceutical Research, 2010.
39. Reigadas Ramirez E, Bouza E S. Economic Burden of *Clostridium difficile* Infection in European Countries. Adv Exp Med Biol. 2018; 1050:1-12
40. Rupaimoole R. & Slack F. J., MicroRNA therapeutics: towards a new era for the management of cancer and other diseases. *Nat Rev Drug Discov.* 2017 Mar. 16(3):203-222.
41. Lagos-Quintana M, Rauhut R, Lendeckel W, Tuschl T. Identification of novel genes coding for small expressed RNAs. *Science.* 2001 Oct. 26; 294(5543):853-8.
42. Romay et al Regulation of NF-κB signaling by oxidized glycerophospholipid and IL-1β induced miRs-21-3p and -27a-5p in human aortic endothelial cells. J Lipid Res. 2015 January; 56(1):38-50
43. Wu et al Coordinated Targeting of the EGFR Signaling Axis by MicroRNA-27a* Oncotarget. 2013 Sep. 4(9): 1388-98
44. Geary R S, Pharmacokinetic properties of 2'-O-(2-methoxyethyl)-modified oligonucleotide analogs in rats. J Pharmacol Exp Ther. 2001 March; 296(3):890-7.
45. Baumann V. and Winckler J. miRNA-based therapies: strategies and delivery platforms for oligonucleotide and non-oligonucleotide agents. Future Med Chem. 2014; 6(17):1967-84
46. Chen H. miR-27a protects human mitral valve interstitial cell from TNF-α-induced inflammatory injury via up-regulation of NELL-1. Braz J Med Biol Res. 2018; 51(6)
47. Arros-Silva D, Costa-Pinheiro P, Duarte H, Sousa E J, Evangelista A F, Graga I, et al. MicroRNA-27a-5p regulation by promoter methylation and MYC signaling in prostate carcinogenesis. Cell Death Dis. 7 févr 2018; 9(2):167
48. Mertens-Talcott S U, Chintharlapalli S, Li X, Safe S. The oncogenic microRNA-27a targets genes that regulate specificity protein transcription factors and the G2-M checkpoint in MDA-MB-231 breast cancer cells. Cancer Res. 15 Nov. 2007; 67(22):11001-11.
49. Xie N. et al, miR-27a regulates inflammatory response of macrophages by targeting IL-10. J Immunol. 2014 Jul. 1; 193(1): 327-334.
50. Pfeiffer D. et al. miR-146a, miR-146b, and miR-155 increase expression of IL-6 and IL-8 and support HSP1.0 in an In vitro sepsis model, PLOS ONE Jun. 29, 2017
51. Gao et al, MicroRNA-146 regulates the inflammatory cytokines expression in vascular endothelial cells during sepsis. Die Pharmazie—An International Journal of Pharmaceutical Sciences, Volume 72, Number 11, November 2017, pp. 700-704(5)

The invention claimed is:

1. A method for decreasing intestinal lesions in a subject suffering from *Clostridium difficile* infection, said method comprising the step of administering to said subject a pharmaceutical composition containing a double-stranded RNA mimic of miR-27a-5p.

2. The method of claim 1, wherein said double-stranded RNA mimic of miR-27a-5p has a nucleotide sequence more than 70% similar to SEQ ID NO: 1.

3. The method of claim 1, wherein said double-stranded RNA mimic of miR-27a-5p has the nucleotide sequence of SEQ ID NO: 1.

4. The method of claim 1, wherein said pharmaceutical composition further comprises a pharmaceutically acceptable excipient.

5. The method of claim 1, wherein said double-stranded RNA mimic of miR-27a-5p is associated with particles selected from the group consisting of liposomes (DOPC), lipid nanoparticles, nanocells, silica nanoparticles, and exosomes.

6. The method of claim 1, wherein said miR-27a-5p mimic RNA is associated with a matrix selected from the group consisting of a neutral lipid emulsion (NLE), polyethylenimine (PEI), and poly(lactide-co-glycolide) (PLGA).

7. The method of claim 1, wherein said miR-27a-5p RNA mimic is conjugated to a chemical molecule selected from the group consisting of lipids, cholesterol, PEG, cyclodextrin, chitosan, dendrimers of poly(amidoamine) or poly(propylenimine), and N-acetyl-D-galactosamine (GalNAc).

8. The method of claim 1, wherein said pharmaceutical composition is administered to said subject intravenously.

* * * * *

SEQUENCE LISTING

<160> NUMBER OF SEQ ID NOS: 37

<210> SEQ ID NO 1
<211> LENGTH: 22
<212> TYPE: RNA
<213> ORGANISM: homo sapiens

<400> SEQUENCE: 1
agggcuuagc ugcuugugag ca                                            22

<210> SEQ ID NO 2
<211> LENGTH: 24
<212> TYPE: RNA
<213> ORGANISM: Artificial Sequence
<220> FEATURE:
<223> OTHER INFORMATION: Synthetic sequence, guide RNA RIBOXX

<400> SEQUENCE: 2
agggcuuagc ugcuugugac cccc                                          24

<210> SEQ ID NO 3
<211> LENGTH: 24
<212> TYPE: RNA
<213> ORGANISM: Artificial Sequence
<220> FEATURE:
<223> OTHER INFORMATION: Synthetic sequence, passenger RNA RIBOXX

<400> SEQUENCE: 3
gggggucaca agcagcuaag cccu                                          24

<210> SEQ ID NO 4
<211> LENGTH: 20
<212> TYPE: DNA
<213> ORGANISM: Artificial Sequence
<220> FEATURE:
<223> OTHER INFORMATION: Synthetic sequence, oligonucleotide primer

<400> SEQUENCE: 4
agggcttagc tgcttgtgag                                               20

<210> SEQ ID NO 5
<211> LENGTH: 20
<212> TYPE: DNA
<213> ORGANISM: Artificial Sequence
<220> FEATURE:
<223> OTHER INFORMATION: Synthetic sequence, hsa-let-7i-5p primer

<400> SEQUENCE: 5
tgaggtagta gtttgtgctg                                               20

<210> SEQ ID NO 6
<211> LENGTH: 23
<212> TYPE: DNA
<213> ORGANISM: Artificial Sequence
<220> FEATURE:
<223> OTHER INFORMATION: Synthetic sequence, hsa-miR-9-5p primer

<400> SEQUENCE: 6
tctttggtta tctagctgta tga                                           23

<210> SEQ ID NO 7
<211> LENGTH: 21
<212> TYPE: DNA
<213> ORGANISM: Artificial Sequence
<220> FEATURE:
<223> OTHER INFORMATION: Synthetic sequence, hsa-miR-18a-5p primer

```
<400> SEQUENCE: 7
taaggtgcat ctagtgcaga t                                              21

<210> SEQ ID NO 8
<211> LENGTH: 22
<212> TYPE: DNA
<213> ORGANISM: Artificial Sequence
<220> FEATURE:
<223> OTHER INFORMATION: Synthetic sequence, hsa-miR-19a-3p primer

<400> SEQUENCE: 8
tgtgcaaatc tatgcaaaac tg                                             22

<210> SEQ ID NO 9
<211> LENGTH: 20
<212> TYPE: DNA
<213> ORGANISM: Artificial Sequence
<220> FEATURE:
<223> OTHER INFORMATION: Synthetic sequence, hsa-miR-27a-5p primer

<400> SEQUENCE: 9
agggcttagc tgcttgtgag                                                20

<210> SEQ ID NO 10
<211> LENGTH: 20
<212> TYPE: DNA
<213> ORGANISM: Artificial Sequence
<220> FEATURE:
<223> OTHER INFORMATION: Synthetic sequence, hsa-miR-129-5p primer

<400> SEQUENCE: 10 cttttttgcgg tctgggcttg                                               20

<210> SEQ ID NO 11
<211> LENGTH: 21
<212> TYPE: DNA
<213> ORGANISM: Artificial Sequence
<220> FEATURE:
<223> OTHER INFORMATION: Synthetic sequence, hsa-miR-132-5p primer

<400> SEQUENCE: 11
accgtggctt tcgattgtta c                                              21

<210> SEQ ID NO 12
<211> LENGTH: 20
<212> TYPE: DNA
<213> ORGANISM: Artificial Sequence
<220> FEATURE:
<223> OTHER INFORMATION: Synthetic sequence, hsa-miR-147a-3p primer

<400> SEQUENCE: 12
gtgtgtggaa atgcttctgc                                                20

<210> SEQ ID NO 13
<211> LENGTH: 20
<212> TYPE: DNA
<213> ORGANISM: Artificial Sequence
<220> FEATURE:
<223> OTHER INFORMATION: Synthetic sequence, hsa-miR-150-5p primer

<400> SEQUENCE: 13
tctcccaacc cttgtaccag                                                20

<210> SEQ ID NO 14
```

```
<211> LENGTH: 23
<212> TYPE: DNA
<213> ORGANISM: Artificial Sequence
<220> FEATURE:
<223> OTHER INFORMATION: Synthetic sequence, hsa-miR-155-5p primer

<400> SEQUENCE: 14
ttaatgctaa tcgtgatagg ggt                                              23

<210> SEQ ID NO 15
<211> LENGTH: 21
<212> TYPE: DNA
<213> ORGANISM: Artificial Sequence
<220> FEATURE:
<223> OTHER INFORMATION: Synthetic sequence, hsa-miR-212-5p primer

<400> SEQUENCE: 15
accttggctc tagactgctt a                                                21

<210> SEQ ID NO 16
<211> LENGTH: 20
<212> TYPE: DNA
<213> ORGANISM: Artificial Sequence
<220> FEATURE:
<223> OTHER INFORMATION: Synthetic sequence, hsa-miR-300-5p primer

<400> SEQUENCE: 16
tatacaaggg cagactcttc                                                  20

<210> SEQ ID NO 17
<211> LENGTH: 23
<212> TYPE: DNA
<213> ORGANISM: Artificial Sequence
<220> FEATURE:
<223> OTHER INFORMATION: Synthetic sequence, hsa-miR-301a-3p primer

<400> SEQUENCE: 17
cagtgcaata gtattgtcaa agc                                              23

<210> SEQ ID NO 18
<211> LENGTH: 20
<212> TYPE: DNA
<213> ORGANISM: Artificial Sequence
<220> FEATURE:
<223> OTHER INFORMATION: Synthetic sequence, hsa-miR-339-5p primer

<400> SEQUENCE: 18
tccctgtcct ccaggagctc                                                  20

<210> SEQ ID NO 19
<211> LENGTH: 21
<212> TYPE: DNA
<213> ORGANISM: Artificial Sequence
<220> FEATURE:
<223> OTHER INFORMATION: Synthetic sequence, hsa-miR-382-5p primer

<400> SEQUENCE: 19
gaagttgttc gtggtggatt c                                                21

<210> SEQ ID NO 20
<211> LENGTH: 20
<212> TYPE: DNA
<213> ORGANISM: Artificial Sequence
<220> FEATURE:
<223> OTHER INFORMATION: Synthetic sequence, hsa-miR-378a-5p primer

<400> SEQUENCE: 20
```
ctcctgactc caggtcctgt                                                    20

<210> SEQ ID NO 21
<211> LENGTH: 20
<212> TYPE: DNA
<213> ORGANISM: Artificial Sequence
<220> FEATURE:
<223> OTHER INFORMATION: Synthetic sequence, hsa-miR-431-5p primer

<400> SEQUENCE: 21
tgtcttgcag gccgtcatgc                                                    20

<210> SEQ ID NO 22
<211> LENGTH: 20
<212> TYPE: DNA
<213> ORGANISM: Artificial Sequence
<220> FEATURE:
<223> OTHER INFORMATION: Synthetic sequence, hsa-miR-520a-5p primer

<400> SEQUENCE: 22
ctccagaggg aagtatttct                                                    20

<210> SEQ ID NO 23
<211> LENGTH: 22
<212> TYPE: DNA
<213> ORGANISM: Artificial Sequence
<220> FEATURE:
<223> OTHER INFORMATION: Synthetic sequence, hsa-miR-524-5p primer

<400> SEQUENCE: 23
ctacaaaggg aagcactttc tc                                                 22

<210> SEQ ID NO 24
<211> LENGTH: 20
<212> TYPE: DNA
<213> ORGANISM: Artificial Sequence
<220> FEATURE:
<223> OTHER INFORMATION: Synthetic sequence, hsa-miR-525-5p primer

<400> SEQUENCE: 24
ctccagaggg atgcactttc                                                    20

<210> SEQ ID NO 25
<211> LENGTH: 21
<212> TYPE: DNA
<213> ORGANISM: Artificial Sequence
<220> FEATURE:
<223> OTHER INFORMATION: Synthetic sequence, hsa-miR-548d3p primer

<400> SEQUENCE: 25
tagcaaaaac tgcagttact t                                                  21

<210> SEQ ID NO 26
<211> LENGTH: 20
<212> TYPE: DNA
<213> ORGANISM: Artificial Sequence
<220> FEATURE:
<223> OTHER INFORMATION: Synthetic sequence, hsa-miR-4766-5p primer

<400> SEQUENCE: 26
tctgaaagag cagttggtgt                                                    20

<210> SEQ ID NO 27
<211> LENGTH: 21
<212> TYPE: DNA

```
<213> ORGANISM: Artificial Sequence
<220> FEATURE:
<223> OTHER INFORMATION: Synthetic sequence, primer for SNORD2
      normalisation

<400> SEQUENCE: 27
tcatctttcg ggactgacct g                                                21

<210> SEQ ID NO 28
<211> LENGTH: 20
<212> TYPE: DNA
<213> ORGANISM: Artificial Sequence
<220> FEATURE:
<223> OTHER INFORMATION: Synthetic sequence, hTNF-alpha sense primer

<400> SEQUENCE: 28
cgagtgacaa gcctgtagcc                                                  20

<210> SEQ ID NO 29
<211> LENGTH: 20
<212> TYPE: DNA
<213> ORGANISM: Artificial Sequence
<220> FEATURE:
<223> OTHER INFORMATION: Synthetic sequence, hTNF-alpha antisense primer

<400> SEQUENCE: 29
gttgaccttg gtctggtagg                                                  20

<210> SEQ ID NO 30
<211> LENGTH: 21
<212> TYPE: DNA
<213> ORGANISM: Artificial Sequence
<220> FEATURE:
<223> OTHER INFORMATION: Synthetic sequence, hIL-8 sense primer

<400> SEQUENCE: 30
ggcacaaact ttcagagaca g                                                21

<210> SEQ ID NO 31
<211> LENGTH: 20
<212> TYPE: DNA
<213> ORGANISM: Artificial Sequence
<220> FEATURE:
<223> OTHER INFORMATION: Synthetic sequence, hIL-8 antisense primer

<400> SEQUENCE: 31
aaatttgggg tggaaaggtt                                                  20

<210> SEQ ID NO 32
<211> LENGTH: 20
<212> TYPE: DNA
<213> ORGANISM: Artificial Sequence
<220> FEATURE:
<223> OTHER INFORMATION: Synthetic sequence, hACTIN sense primer

<400> SEQUENCE: 32
agaaaatctg gcaccacacc                                                  20

<210> SEQ ID NO 33
<211> LENGTH: 20
<212> TYPE: DNA
<213> ORGANISM: Artificial Sequence
<220> FEATURE:
<223> OTHER INFORMATION: Synthetic sequence, hACTIN antisense primer

<400> SEQUENCE: 33
```

```
agaggcgtac agggatagca                                              20

<210> SEQ ID NO 34
<211> LENGTH: 20
<212> TYPE: DNA
<213> ORGANISM: Artificial Sequence
<220> FEATURE:
<223> OTHER INFORMATION: Synthetic sequence, mKC (IL-8) sense primer

<400> SEQUENCE: 34
gctgggattc acctcaagaa                                              20

<210> SEQ ID NO 35
<211> LENGTH: 20
<212> TYPE: DNA
<213> ORGANISM: Artificial Sequence
<220> FEATURE:
<223> OTHER INFORMATION: Synthetic sequence, mKC (IL-8) antisense primer

<400> SEQUENCE: 35
aggtgccatc agagcagtct                                              20

<210> SEQ ID NO 36
<211> LENGTH: 20
<212> TYPE: DNA
<213> ORGANISM: Artificial Sequence
<220> FEATURE:
<223> OTHER INFORMATION: Synthetic sequence, mGAPDH sense primer

<400> SEQUENCE: 36
gaactggcag aagaggcact                                              20

<210> SEQ ID NO 37
<211> LENGTH: 20
<212> TYPE: DNA
<213> ORGANISM: Artificial Sequence
<220> FEATURE:
<223> OTHER INFORMATION: Synthetic sequence, mGAPDH antisense primer

<400> SEQUENCE: 37
agggtctggg ccatagaact                                              20
```